US012670674B2

(12) United States Patent
Crispin et al.

(10) Patent No.: US 12,670,674 B2
(45) Date of Patent: Jun. 30, 2026

(54) MAINTAINING AR/VR CONTENT AT A RE-DEFINED POSITION

(71) Applicant: Snap Inc., Santa Monica, CA (US)

(72) Inventors: Sterling Crispin, Santa Cruz, CA (US);
Karen Stolzenberg, Venice, CA (US);
Brian Wong, Murrieta, CA (US)

(73) Assignee: Snap Inc., Santa Monica, CA (US)

( * ) Notice: Subject to any disclaimer, the term of this patent is extended or adjusted under 35 U.S.C. 154(b) by 143 days.

(21) Appl. No.: 18/436,580

(22) Filed: Feb. 8, 2024

(65) Prior Publication Data

US 2025/0259398 A1     Aug. 14, 2025

(51) Int. Cl.
G06T 19/00     (2011.01)
G06T 19/20     (2011.01)
G06V 40/20     (2022.01)

(52) U.S. Cl.
CPC ............ G06T 19/006 (2013.01); G06T 19/20 (2013.01); G06V 40/20 (2022.01); *G06T 2219/2004* (2013.01)

(58) Field of Classification Search
CPC .............................. G06T 19/006; G06T 19/20
See application file for complete search history.

(56) References Cited

U.S. PATENT DOCUMENTS

| | | |
|---|---|---|
| 5,604,843 A | 2/1997 | Shaw et al. |
| 5,689,559 A | 11/1997 | Park |
| 5,880,731 A | 3/1999 | Liles et al. |
| 6,023,270 A | 2/2000 | Brush, II et al. |
| RE36,919 E | 10/2000 | Park |
| RE37,052 E | 2/2001 | Park |
| 6,223,165 B1 | 4/2001 | Lauffer |
| 6,650,793 B1 | 11/2003 | Lund et al. |
| 6,750,890 B1 | 6/2004 | Sugimoto et al. |
| 6,772,195 B1 | 8/2004 | Hatlelid et al. |
| 6,804,417 B1 | 10/2004 | Lund et al. |
| 6,842,779 B1 | 1/2005 | Nishizawa |
| 7,342,587 B2 | 3/2008 | Danzig et al. |

(Continued)

FOREIGN PATENT DOCUMENTS

| | | |
|---|---|---|
| CN | 103049761 B | 8/2016 |
| CN | 109863532 A | 6/2019 |

(Continued)

OTHER PUBLICATIONS

"U.S. Appl. No. 18/471,056, Final Office Action mailed Feb. 13, 2025", 36 pgs.

(Continued)

*Primary Examiner* — Charles Tseng
(74) *Attorney, Agent, or Firm* — Schwegman Lundberg & Woessner, P.A.

(57) ABSTRACT

The systems and methods display, by at least one processor on a first portion of a real-world environment visible on a display of a user device, one or more virtual objects at a first virtual coordinate in three-dimensional (3D) space. The systems and methods receive a request to move the one or more virtual objects to a second virtual coordinate in 3D space. The systems and methods in response to receiving the request, maintain display of the one or more virtual objects at the second virtual coordinate as a second portion of the real-world environment is visible on the display of the user device.

20 Claims, 10 Drawing Sheets

500

DISPLAY, ON A FIRST PORTION OF A REAL-WORLD ENVIRONMENT VISIBLE ON A DISPLAY OF A USER DEVICE, ONE OR MORE VIRTUAL OBJECTS AT A FIRST VIRTUAL COORDINATE IN THREE-DIMENSIONAL (3D) SPACE ~501

RECEIVE A REQUEST TO MOVE THE ONE OR MORE VIRTUAL OBJECTS TO A SECOND VIRTUAL COORDINATE IN 3D SPACE ~502

IN RESPONSE TO RECEIVING THE REQUEST, MAINTAIN DISPLAY OF THE ONE OR MORE VIRTUAL OBJECTS AT THE SECOND VIRTUAL COORDINATE AS THE USER DEVICE AND A SECOND PORTION OF THE REAL-WORLD ENVIRONMENT IS VISIBLE ON THE DISPLAY OF THE USER DEVICE ~503

(56)  References Cited

U.S. PATENT DOCUMENTS

| | | | |
|---|---|---|---|
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 7,971,156 B2 | 6/2011 | Albertson et al. |
| 7,996,793 B2 | 8/2011 | Latta et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| RE43,993 E | 2/2013 | Park |
| 8,384,719 B2 | 2/2013 | Reville et al. |
| RE44,054 E | 3/2013 | Kim |
| RE44,068 E | 3/2013 | Park |
| RE44,106 E | 3/2013 | Park |
| 8,396,708 B2 | 3/2013 | Park et al. |
| RE44,121 E | 4/2013 | Park |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,487,938 B2 | 7/2013 | Latta et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,856,691 B2 | 10/2014 | Geisner et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,971,572 B1 | 3/2015 | Yin et al. |
| 8,989,786 B2 | 3/2015 | Feghall |
| 9,086,776 B2 | 7/2015 | Ye et al. |
| 9,105,014 B2 | 8/2015 | Collet et al. |
| 9,191,620 B1 | 11/2015 | Katzer et al. |
| 9,225,897 B1 | 12/2015 | Sehn et al. |
| 9,230,160 B1 | 1/2016 | Kanter |
| 9,241,184 B2 | 1/2016 | Weerasinghe |
| 9,256,860 B2 | 2/2016 | Herger et al. |
| 9,270,811 B1 | 2/2016 | Atlas |
| 9,276,886 B1 | 3/2016 | Samaranayake |
| 9,292,082 B1 | 3/2016 | Patel et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,429,755 B2 | 8/2016 | Kim et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,532,364 B2 | 12/2016 | Fujito |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,705,831 B2 | 7/2017 | Spiegel |
| 9,706,040 B2 | 7/2017 | Kadirvel et al. |
| 9,742,713 B2 | 8/2017 | Spiegel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,977,523 B2 | 5/2018 | Kim et al. |
| 9,980,100 B1 | 5/2018 | Charlton et al. |
| 9,990,373 B2 | 6/2018 | Fortkort |
| 9,992,241 B1 | 6/2018 | Huang et al. |
| 10,039,988 B2 | 8/2018 | Lobb et al. |
| 10,061,352 B1 | 8/2018 | Trail |
| 10,097,492 B2 | 10/2018 | Tsuda et al. |
| 10,102,423 B2 | 10/2018 | Shaburov et al. |
| 10,116,598 B2 | 10/2018 | Tucker et al. |
| 10,155,168 B2 | 12/2018 | Blackstock et al. |
| 10,158,589 B2 | 12/2018 | Collet et al. |
| 10,242,477 B1 | 3/2019 | Charlton et al. |
| 10,242,503 B2 | 3/2019 | McPhee et al. |
| 10,261,595 B1 | 4/2019 | Kin |
| 10,262,250 B1 | 4/2019 | Spiegel et al. |
| 10,269,180 B2 | 4/2019 | Yamamoto et al. |
| 10,281,992 B2 | 5/2019 | Cohen et al. |
| 10,284,508 B1 | 5/2019 | Allen et al. |
| 10,289,660 B2 | 5/2019 | Karunamuni et al. |
| 10,348,662 B2 | 7/2019 | Baldwin et al. |
| 10,362,219 B2 | 7/2019 | Wilson et al. |
| 10,402,081 B1 | 9/2019 | Andersen et al. |
| 10,432,559 B2 | 10/2019 | Baldwin et al. |
| 10,439,972 B1 | 10/2019 | Spiegel et al. |
| 10,454,857 B1 | 10/2019 | Blackstock et al. |
| 10,475,225 B2 | 11/2019 | Park et al. |
| 10,503,264 B1 | 12/2019 | Blachly et al. |
| 10,504,266 B2 | 12/2019 | Blattner et al. |
| 10,509,466 B1 | 12/2019 | Miller et al. |
| 10,514,876 B2 | 12/2019 | Sehn |
| 10,515,484 B1 | 12/2019 | Lucas et al. |
| 10,551,937 B2 | 2/2020 | Dash |
| 10,573,048 B2 | 2/2020 | Ni et al. |
| 10,579,869 B1 | 3/2020 | Xiong et al. |
| 10,591,730 B2 | 3/2020 | Rodriguez, II et al. |
| 10,614,855 B2 | 4/2020 | Huang |
| 10,645,092 B1 | 5/2020 | Bonar et al. |
| 10,656,797 B1 | 5/2020 | Alvi et al. |
| 10,657,695 B2 | 5/2020 | Chand et al. |
| 10,657,701 B2 | 5/2020 | Osman et al. |
| 10,748,347 B1 | 8/2020 | Li et al. |
| 10,762,174 B2 | 9/2020 | Denton et al. |
| 10,764,053 B2 | 9/2020 | Brook et al. |
| 10,805,248 B2 | 10/2020 | Luo et al. |
| 10,852,814 B1 | 12/2020 | Caron et al. |
| 10,857,450 B1 | 12/2020 | Aman et al. |
| 10,872,451 B2 | 12/2020 | Sheth et al. |
| 10,880,246 B2 | 12/2020 | Baldwin et al. |
| 10,895,964 B1 | 1/2021 | Grantham et al. |
| 10,896,534 B1 | 1/2021 | Smith et al. |
| 10,933,311 B2 | 3/2021 | Brody et al. |
| 10,938,758 B2 | 3/2021 | Allen et al. |
| 10,957,059 B1 | 3/2021 | Katz et al. |
| 10,958,608 B1 | 3/2021 | Allen et al. |
| 10,962,809 B1 | 3/2021 | Castañeda |
| 10,964,082 B2 | 3/2021 | Amitay et al. |

(56) References Cited

U.S. PATENT DOCUMENTS

| 10,979,752 B1 | 4/2021 | Brody et al. |
| 10,984,575 B2 | 4/2021 | Assouline et al. |
| 10,992,619 B2 | 4/2021 | Antmen et al. |
| 10,996,846 B2 | 5/2021 | Robertson et al. |
| 10,997,787 B2 | 5/2021 | Ge et al. |
| 11,010,022 B2 | 5/2021 | Alvi et al. |
| 11,012,390 B1 | 5/2021 | Al Majid et al. |
| 11,030,454 B1 | 6/2021 | Xiong et al. |
| 11,030,789 B2 | 6/2021 | Chand et al. |
| 11,036,368 B1 | 6/2021 | Al Majid et al. |
| 11,036,781 B1 | 6/2021 | Baril et al. |
| 11,055,891 B1 | 7/2021 | Ofek et al. |
| 11,062,498 B1 | 7/2021 | Voss et al. |
| 11,063,891 B2 | 7/2021 | Voss |
| 11,069,103 B1 | 7/2021 | Blackstock et al. |
| 11,080,917 B2 | 8/2021 | Monroy-hernández et al. |
| 11,087,728 B1 | 8/2021 | Canberk et al. |
| 11,092,998 B1 | 8/2021 | Castañeda et al. |
| 11,106,342 B1 | 8/2021 | Al Majid et al. |
| 11,126,206 B2 | 9/2021 | Meisenholder et al. |
| 11,128,586 B2 | 9/2021 | Al Majid et al. |
| 11,143,867 B2 | 10/2021 | Rodriguez, II |
| 11,169,600 B1 | 11/2021 | Canberk et al. |
| 11,188,190 B2 | 11/2021 | Blackstock et al. |
| 11,189,070 B2 | 11/2021 | Jahangiri et al. |
| 11,199,957 B1 | 12/2021 | Alvi et al. |
| 11,218,433 B2 | 1/2022 | Baldwin et al. |
| 11,227,626 B1 | 1/2022 | Krishnan Gorumkonda et al. |
| 11,229,849 B2 | 1/2022 | Blackstock et al. |
| 11,233,799 B1 | 1/2022 | Whyte et al. |
| 11,237,640 B2 | 2/2022 | Zhu et al. |
| 11,245,658 B2 | 2/2022 | Grantham et al. |
| 11,249,556 B1 | 2/2022 | Schwarz et al. |
| 11,249,614 B2 | 2/2022 | Brody |
| 11,263,254 B2 | 3/2022 | Baril et al. |
| 11,270,491 B2 | 3/2022 | Monroy-Hernández et al. |
| 11,284,144 B2 | 3/2022 | Kotsopoulos et al. |
| 11,307,747 B2 | 4/2022 | Dancie et al. |
| 11,340,756 B2 | 5/2022 | Faulkner et al. |
| 11,360,733 B2 | 6/2022 | Cardenas Gasca et al. |
| 11,361,735 B1 | 6/2022 | Wang et al. |
| 11,452,939 B2 | 9/2022 | Tham et al. |
| 11,455,078 B1 | 9/2022 | Goodrich et al. |
| 11,531,402 B1 | 12/2022 | Stolzenberg |
| 11,546,505 B2 | 1/2023 | Canberk |
| 11,782,577 B2 | 10/2023 | Goodrich et al. |
| 11,797,162 B2 | 10/2023 | Goodrich et al. |
| 11,847,302 B2 | 12/2023 | Goodrich et al. |
| 12,105,283 B2 | 10/2024 | Goodrich et al. |
| 12,135,862 B2 | 11/2024 | Goodrich et al. |
| 12,229,342 B2 | 2/2025 | Goodrich et al. |
| 12,236,512 B2 | 2/2025 | Tran et al. |
| 12,443,335 B2 | 10/2025 | Goodrich et al. |
| 2002/0067362 A1 | 6/2002 | Agostino Nocera et al. |
| 2002/0169644 A1 | 11/2002 | Greene |
| 2003/0090524 A1 | 5/2003 | Segerberg et al. |
| 2003/0154300 A1 | 8/2003 | Mostafa |
| 2004/0203956 A1 | 10/2004 | Tsampalis |
| 2004/0233238 A1 | 11/2004 | Lahdesmaki |
| 2005/0076309 A1 | 4/2005 | Goldsmith |
| 2005/0108392 A1 | 5/2005 | Glasser et al. |
| 2005/0160451 A1 | 7/2005 | Batra et al. |
| 2005/0162419 A1 | 7/2005 | Kim et al. |
| 2005/0206610 A1 | 9/2005 | Cordelli |
| 2005/0210410 A1 | 9/2005 | Ohwa |
| 2006/0001650 A1 | 1/2006 | Robbins et al. |
| 2006/0294465 A1 | 12/2006 | Ronen et al. |
| 2007/0113181 A1 | 5/2007 | Blattner et al. |
| 2007/0150830 A1 | 6/2007 | Ording et al. |
| 2007/0168863 A1 | 7/2007 | Blattner et al. |
| 2007/0176921 A1 | 8/2007 | Iwasaki et al. |
| 2008/0094417 A1 | 4/2008 | Cohen |
| 2008/0114850 A1 | 5/2008 | Skog et al. |
| 2008/0158222 A1 | 7/2008 | Li et al. |
| 2009/0012788 A1 | 1/2009 | Gilbert et al. |
| 2009/0016617 A1 | 1/2009 | Bregman-Amital et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177641 A1 | 7/2009 | Raghavan |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0125811 A1 | 5/2010 | Moore et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2010/0289740 A1 | 11/2010 | Kim et al. |
| 2011/0050562 A1 | 3/2011 | Schoen et al. |
| 2011/0093780 A1 | 4/2011 | Dunn |
| 2011/0109577 A1 | 5/2011 | Lee et al. |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2011/0292177 A1 | 12/2011 | Sakurai et al. |
| 2011/0301934 A1 | 12/2011 | Tardif |
| 2012/0113106 A1 | 5/2012 | Choi et al. |
| 2012/0124458 A1 | 5/2012 | Cruzada et al. |
| 2012/0130717 A1 | 5/2012 | Xu et al. |
| 2012/0144331 A1 | 6/2012 | Tolonen et al. |
| 2012/0214585 A1 | 8/2012 | Paquet |
| 2012/0236031 A1 | 9/2012 | Haddick et al. |
| 2012/0249416 A1 | 10/2012 | Maciocci et al. |
| 2013/0016070 A1 | 1/2013 | Starner et al. |
| 2013/0055362 A1 | 2/2013 | Rathbun |
| 2013/0088455 A1 | 4/2013 | Jeong |
| 2013/0103760 A1 | 4/2013 | Golding et al. |
| 2013/0134212 A1 | 5/2013 | Chang |
| 2013/0201187 A1 | 8/2013 | Tong et al. |
| 2013/0249948 A1 | 9/2013 | Reitan |
| 2013/0254695 A1 | 9/2013 | Lambourne et al. |
| 2013/0257877 A1 | 10/2013 | Davis |
| 2013/0286004 A1 | 10/2013 | Mcculloch et al. |
| 2014/0043329 A1 | 2/2014 | Wang et al. |
| 2014/0053086 A1 | 2/2014 | Kim et al. |
| 2014/0055343 A1 | 2/2014 | Kim |
| 2014/0055554 A1 | 2/2014 | Du et al. |
| 2014/0115114 A1 | 4/2014 | Garmark et al. |
| 2014/0125678 A1 | 5/2014 | Wang et al. |
| 2014/0129343 A1 | 5/2014 | Finster et al. |
| 2014/0171036 A1 | 6/2014 | Simmons |
| 2014/0201666 A1 | 7/2014 | Bedikian et al. |
| 2014/0267189 A1 | 9/2014 | Moll et al. |
| 2014/0289676 A1 | 9/2014 | Yoritate et al. |
| 2014/0365920 A1 | 12/2014 | Daniels et al. |
| 2014/0375683 A1 | 12/2014 | Salter et al. |
| 2015/0009124 A1 | 1/2015 | Antoniac |
| 2015/0022551 A1* | 1/2015 | Kim ..................... G06T 19/006 345/633 |
| 2015/0029223 A1* | 1/2015 | Kaino ................... G09G 3/002 345/633 |
| 2015/0062162 A1 | 3/2015 | Kim et al. |
| 2015/0078586 A1 | 3/2015 | Ang et al. |
| 2015/0085058 A1 | 3/2015 | Zhang et al. |
| 2015/0089451 A1 | 3/2015 | Jin et al. |
| 2015/0091780 A1* | 4/2015 | Lyren .................. G02B 27/017 345/8 |
| 2015/0103021 A1 | 4/2015 | Lim et al. |
| 2015/0120293 A1 | 4/2015 | Wohlert et al. |
| 2015/0186007 A1 | 7/2015 | Suzuki et al. |
| 2015/0187357 A1 | 7/2015 | Xia et al. |
| 2015/0206349 A1 | 7/2015 | Rosenthal et al. |
| 2015/0215581 A1 | 7/2015 | Barzuza et al. |
| 2015/0271120 A1 | 9/2015 | Langholz |
| 2015/0287403 A1 | 10/2015 | Holzer Zaslansky et al. |
| 2015/0306496 A1 | 10/2015 | Haseltine |
| 2015/0309316 A1 | 10/2015 | Osterhout et al. |

(56) References Cited

U.S. PATENT DOCUMENTS

| | | |
|---|---|---|
| 2015/0324087 A1 | 11/2015 | Gregory et al. |
| 2015/0324645 A1 | 11/2015 | Jang et al. |
| 2015/0370320 A1 | 12/2015 | Connor |
| 2016/0021148 A1 | 1/2016 | Ijaz |
| 2016/0092035 A1 | 3/2016 | Crocker et al. |
| 2016/0110922 A1 | 4/2016 | Haring |
| 2016/0113550 A1 | 4/2016 | Martin |
| 2016/0134840 A1 | 5/2016 | Mcculloch |
| 2016/0162531 A1 | 6/2016 | Beattie, Jr. et al. |
| 2016/0189315 A1 | 6/2016 | Anania et al. |
| 2016/0232715 A1 | 8/2016 | Lee |
| 2016/0234149 A1 | 8/2016 | Tsuda et al. |
| 2016/0259517 A1 | 9/2016 | Butcher et al. |
| 2016/0320853 A1 | 11/2016 | Lien et al. |
| 2016/0346612 A1 | 12/2016 | Rowley |
| 2017/0038829 A1 | 2/2017 | Lanier et al. |
| 2017/0046058 A1 | 2/2017 | Karunamuni et al. |
| 2017/0080346 A1 | 3/2017 | Abbas |
| 2017/0087473 A1 | 3/2017 | Siegel et al. |
| 2017/0090747 A1 | 3/2017 | Dash |
| 2017/0097687 A1 | 4/2017 | Pinault et al. |
| 2017/0111723 A1 | 4/2017 | Boesen |
| 2017/0113140 A1 | 4/2017 | Blackstock et al. |
| 2017/0118145 A1 | 4/2017 | Aittoniemi et al. |
| 2017/0123487 A1 | 5/2017 | Hazra et al. |
| 2017/0169616 A1* | 6/2017 | Wiley ................. G06F 3/04815 |
| 2017/0192495 A1 | 7/2017 | Drinkwater et al. |
| 2017/0195736 A1 | 7/2017 | Chai et al. |
| 2017/0195739 A1 | 7/2017 | Wessel |
| 2017/0199855 A1 | 7/2017 | Fishbeck |
| 2017/0228130 A1 | 8/2017 | Palmaro |
| 2017/0235848 A1 | 8/2017 | Van Deusen et al. |
| 2017/0236197 A1 | 8/2017 | Acken et al. |
| 2017/0237789 A1* | 8/2017 | Harner ................ H04L 65/4015 709/205 |
| 2017/0277684 A1 | 9/2017 | Dharmarajan Mary |
| 2017/0277685 A1 | 9/2017 | Takumi |
| 2017/0287225 A1 | 10/2017 | Powderly et al. |
| 2017/0307889 A1 | 10/2017 | Newman |
| 2017/0310934 A1 | 10/2017 | Du et al. |
| 2017/0312634 A1 | 11/2017 | Ledoux et al. |
| 2017/0322655 A1 | 11/2017 | Stafford |
| 2017/0351910 A1 | 12/2017 | Elwazer et al. |
| 2017/0353417 A1 | 12/2017 | Langholz |
| 2017/0354875 A1 | 12/2017 | Marks et al. |
| 2018/0004392 A1 | 1/2018 | Yang et al. |
| 2018/0005429 A1 | 1/2018 | Osman et al. |
| 2018/0005443 A1 | 1/2018 | Poulos et al. |
| 2018/0034867 A1 | 2/2018 | Zahn et al. |
| 2018/0046245 A1 | 2/2018 | Schwarz et al. |
| 2018/0047200 A1 | 2/2018 | O'Hara et al. |
| 2018/0062691 A1 | 3/2018 | Barnett, Jr. |
| 2018/0067914 A1 | 3/2018 | Chen et al. |
| 2018/0075658 A1 | 3/2018 | Lanier et al. |
| 2018/0088663 A1 | 3/2018 | Zhang et al. |
| 2018/0101986 A1 | 4/2018 | Burns et al. |
| 2018/0107276 A1 | 4/2018 | Heubel et al. |
| 2018/0113587 A1 | 4/2018 | Allen et al. |
| 2018/0115503 A1 | 4/2018 | Baldwin et al. |
| 2018/0158370 A1 | 6/2018 | Pryor |
| 2018/0198743 A1 | 7/2018 | Blackstock et al. |
| 2018/0239144 A1 | 8/2018 | Woods et al. |
| 2018/0268589 A1 | 9/2018 | Grant |
| 2018/0315076 A1 | 11/2018 | Andreou |
| 2018/0315133 A1 | 11/2018 | Brody et al. |
| 2018/0315134 A1 | 11/2018 | Amitay et al. |
| 2018/0315247 A1 | 11/2018 | Van |
| 2018/0321826 A1 | 11/2018 | Bereza et al. |
| 2018/0329209 A1 | 11/2018 | Nattukallingal |
| 2018/0335930 A1 | 11/2018 | Scapel et al. |
| 2018/0343023 A1 | 11/2018 | Park et al. |
| 2018/0349690 A1 | 12/2018 | Rhee et al. |
| 2018/0350144 A1 | 12/2018 | Rathod |
| 2018/0350150 A1 | 12/2018 | Powderly et al. |
| 2019/0001223 A1 | 1/2019 | Blackstock et al. |
| 2019/0019508 A1 | 1/2019 | Rochford et al. |
| 2019/0052587 A1 | 2/2019 | Andreou et al. |
| 2019/0054379 A1 | 2/2019 | Ackley et al. |
| 2019/0057616 A1 | 2/2019 | Cohen et al. |
| 2019/0066387 A1 | 2/2019 | Grossmann et al. |
| 2019/0097958 A1 | 3/2019 | Collet et al. |
| 2019/0114802 A1 | 4/2019 | Lazarow |
| 2019/0146219 A1 | 5/2019 | Rodriguez, II |
| 2019/0151757 A1 | 5/2019 | Kozloski et al. |
| 2019/0172262 A1 | 6/2019 | Mchugh et al. |
| 2019/0179405 A1 | 6/2019 | Sun et al. |
| 2019/0187765 A1 | 6/2019 | Ashwood et al. |
| 2019/0188918 A1 | 6/2019 | Brewer et al. |
| 2019/0188920 A1 | 6/2019 | Mcphee et al. |
| 2019/0205010 A1 | 7/2019 | Fujli et al. |
| 2019/0266405 A1 | 8/2019 | Chang |
| 2019/0272674 A1 | 9/2019 | Comer et al. |
| 2019/0280997 A1 | 9/2019 | Baldwin et al. |
| 2019/0295320 A1 | 9/2019 | Ghatak et al. |
| 2019/0307982 A1 | 10/2019 | Brodsky |
| 2019/0310757 A1 | 10/2019 | Lee et al. |
| 2019/0340799 A1 | 11/2019 | Dryer et al. |
| 2019/0342507 A1 | 11/2019 | Dye et al. |
| 2019/0356705 A1 | 11/2019 | Escudero et al. |
| 2019/0362557 A1 | 11/2019 | Lacey et al. |
| 2019/0369839 A1 | 12/2019 | Yang et al. |
| 2020/0005026 A1 | 1/2020 | Andersen et al. |
| 2020/0034033 A1 | 1/2020 | Chaudhri et al. |
| 2020/0036830 A1 | 1/2020 | Hatanaka et al. |
| 2020/0042095 A1 | 2/2020 | Ang et al. |
| 2020/0066049 A1 | 2/2020 | Sun et al. |
| 2020/0073483 A1 | 3/2020 | Berenzweig et al. |
| 2020/0098187 A1 | 3/2020 | Herscher et al. |
| 2020/0104039 A1 | 4/2020 | Robertson et al. |
| 2020/0142497 A1 | 5/2020 | Zhu et al. |
| 2020/0162851 A1 | 5/2020 | Wilde |
| 2020/0167120 A1 | 5/2020 | Rakshit et al. |
| 2020/0201514 A1 | 6/2020 | Murphy et al. |
| 2020/0226814 A1 | 7/2020 | Tang et al. |
| 2020/0226835 A1 | 7/2020 | Farchy et al. |
| 2020/0279104 A1 | 9/2020 | Andersen et al. |
| 2020/0293155 A1 | 9/2020 | Shin |
| 2020/0301500 A1 | 9/2020 | Wilde et al. |
| 2020/0301575 A1 | 9/2020 | Lindholm et al. |
| 2020/0306637 A1 | 10/2020 | Baldwin et al. |
| 2020/0348767 A1 | 11/2020 | Araújo et al. |
| 2020/0360823 A1 | 11/2020 | Cahill et al. |
| 2020/0372127 A1 | 11/2020 | Denton et al. |
| 2020/0387228 A1 | 12/2020 | Ravasz et al. |
| 2020/0387286 A1 | 12/2020 | Ravasz et al. |
| 2020/0387295 A1 | 12/2020 | Schoppe et al. |
| 2020/0410575 A1 | 12/2020 | Grantham et al. |
| 2021/0004146 A1 | 1/2021 | Linville et al. |
| 2021/0011612 A1 | 1/2021 | Dancie et al. |
| 2021/0012574 A1 | 1/2021 | Fu et al. |
| 2021/0019739 A1 | 1/2021 | Almonte et al. |
| 2021/0042724 A1 | 2/2021 | Rathod |
| 2021/0051147 A1 | 2/2021 | Hardy et al. |
| 2021/0074016 A1 | 3/2021 | Li et al. |
| 2021/0074047 A1 | 3/2021 | Sheth et al. |
| 2021/0089179 A1 | 3/2021 | Grantham et al. |
| 2021/0097286 A1 | 4/2021 | Lehrich et al. |
| 2021/0104087 A1 | 4/2021 | Smith et al. |
| 2021/0118231 A1 | 4/2021 | Hutten et al. |
| 2021/0157412 A1 | 5/2021 | Katz |
| 2021/0166732 A1 | 6/2021 | Shaburova et al. |
| 2021/0168108 A1 | 6/2021 | Antmen et al. |
| 2021/0170270 A1 | 6/2021 | Brody et al. |
| 2021/0174034 A1 | 6/2021 | Retek et al. |
| 2021/0192823 A1 | 6/2021 | Amitay et al. |
| 2021/0200324 A1 | 7/2021 | Doganis |
| 2021/0209825 A1 | 7/2021 | Assouline et al. |
| 2021/0225058 A1 | 7/2021 | Chand et al. |
| 2021/0240315 A1 | 8/2021 | Alvi et al. |
| 2021/0241529 A1 | 8/2021 | Cowburn et al. |
| 2021/0243482 A1 | 8/2021 | Baril et al. |
| 2021/0243503 A1 | 8/2021 | Kotsopoulos et al. |
| 2021/0247849 A1 | 8/2021 | Sokol et al. |
| 2021/0266277 A1 | 8/2021 | Allen et al. |

(56) References Cited

U.S. PATENT DOCUMENTS

| | | |
|---|---|---|
| 2021/0281897 A1 | 9/2021 | Brody et al. |
| 2021/0285774 A1 | 9/2021 | Collins et al. |
| 2021/0303075 A1 | 9/2021 | Cowburn et al. |
| 2021/0303077 A1 | 9/2021 | Anvaripour et al. |
| 2021/0303140 A1 | 9/2021 | Mourkogiannis |
| 2021/0306290 A1 | 9/2021 | Voss |
| 2021/0306451 A1 | 9/2021 | Heikkinen et al. |
| 2021/0334733 A1 | 10/2021 | Peters |
| 2021/0362029 A1 | 11/2021 | Koblin et al. |
| 2021/0364811 A1 | 11/2021 | Amadio |
| 2021/0382564 A1 | 12/2021 | Blachly et al. |
| 2021/0385180 A1 | 12/2021 | Majid et al. |
| 2021/0397000 A1 | 12/2021 | Rodriguez, II |
| 2021/0405761 A1 | 12/2021 | Canberk |
| 2021/0405772 A1 | 12/2021 | Canberk et al. |
| 2021/0405831 A1 | 12/2021 | Mourkogiannis et al. |
| 2021/0409535 A1 | 12/2021 | Mourkogiannis et al. |
| 2021/0409954 A1 | 12/2021 | Frisk et al. |
| 2022/0012929 A1 | 1/2022 | Blackstock et al. |
| 2022/0030197 A1 | 1/2022 | Ishimoto |
| 2022/0075591 A1 | 3/2022 | Cardenas Gasca et al. |
| 2022/0092857 A1 | 3/2022 | Haapoja et al. |
| 2022/0101000 A1 | 3/2022 | Tham et al. |
| 2022/0157002 A1 | 5/2022 | Gelencser |
| 2022/0179665 A1 | 6/2022 | Rathod |
| 2022/0188539 A1 | 6/2022 | Chan et al. |
| 2022/0197027 A1 | 6/2022 | Goodrich et al. |
| 2022/0197393 A1 | 6/2022 | Goodrich et al. |
| 2022/0197446 A1 | 6/2022 | Goodrich et al. |
| 2022/0197485 A1 | 6/2022 | Goodrich et al. |
| 2022/0198603 A1 | 6/2022 | Goodrich et al. |
| 2022/0206588 A1 | 6/2022 | Canberk et al. |
| 2022/0222881 A1 | 7/2022 | Nakade et al. |
| 2022/0276823 A1 | 9/2022 | Cardenas Gasca et al. |
| 2022/0300730 A1 | 9/2022 | Eirinberg et al. |
| 2022/0300731 A1 | 9/2022 | Eirinberg et al. |
| 2022/0301231 A1 | 9/2022 | Eirinberg et al. |
| 2022/0326781 A1 | 10/2022 | Hwang et al. |
| 2022/0334649 A1 | 10/2022 | Hwang et al. |
| 2022/0375174 A1 | 11/2022 | Arya et al. |
| 2022/0382377 A1 | 12/2022 | Hosseinkhani Loorak et al. |
| 2022/0397989 A1 | 12/2022 | Catalano et al. |
| 2023/0055634 A1 | 2/2023 | Goodrich et al. |
| 2023/0067305 A1 | 3/2023 | Assa et al. |
| 2023/0230152 A1* | 7/2023 | Debreczeni ............ H04N 5/272 705/27.2 |
| 2023/0297161 A1 | 9/2023 | Moll |
| 2023/0300292 A1 | 9/2023 | Barbosa Da Silva et al. |
| 2023/0400965 A1 | 12/2023 | Goodrich et al. |
| 2023/0418542 A1 | 12/2023 | Cardenas Gasca |
| 2024/0012549 A1 | 1/2024 | Goodrich et al. |
| 2024/0032121 A1 | 1/2024 | Zhuang et al. |
| 2024/0070950 A1 | 2/2024 | Tran et al. |
| 2024/0198235 A1 | 6/2024 | Kudo et al. |
| 2025/0138645 A1 | 5/2025 | Goodrich et al. |
| 2025/0148683 A1 | 5/2025 | Tran et al. |

FOREIGN PATENT DOCUMENTS

| | | |
|---|---|---|
| CN | 109885367 A | 6/2019 |
| CN | 110168478 A | 8/2019 |
| CN | 116113478 A | 5/2023 |
| CN | 116635771 A | 8/2023 |
| CN | 116670632 A | 8/2023 |
| CN | 116685938 A | 9/2023 |
| CN | 116724286 A | 9/2023 |
| CN | 116802590 A | 9/2023 |
| CN | 119768759 A | 4/2025 |
| EP | 2184092 A2 | 5/2010 |
| EP | 3707693 A1 | 9/2020 |
| EP | 4172726 A1 | 5/2023 |
| EP | 4172730 A1 | 5/2023 |
| JP | 2001230801 A | 8/2001 |
| JP | 5497931 B2 | 3/2014 |
| JP | 2018032329 A | 3/2018 |
| KR | 20120040000 A | 4/2012 |
| KR | 101445263 B1 | 9/2014 |
| KR | 20150051769 A | 5/2015 |
| KR | 20160084502 A | 7/2016 |
| KR | 20210121616 A | 10/2021 |
| KR | 20220158824 A | 12/2022 |
| KR | 102861516 B1 | 9/2025 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2009137419 A2 | 11/2009 |
| WO | WO-2012139276 A1 | 10/2012 |
| WO | WO-2013027893 A1 | 2/2013 |
| WO | WO-2013064854 A1 | 5/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2015192117 A1 | 12/2015 |
| WO | WO-2016090605 A1 | 6/2016 |
| WO | WO-2016168591 A1 | 10/2016 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |
| WO | WO-2019094618 A1 | 5/2019 |
| WO | WO-2021206578 A1 | 10/2021 |
| WO | WO-2022005687 A1 | 1/2022 |
| WO | WO-2022005693 A1 | 1/2022 |
| WO | WO-2022056132 A2 | 3/2022 |
| WO | WO-2022056132 A3 | 3/2022 |
| WO | WO-2022060549 A2 | 3/2022 |
| WO | WO-2022066578 A1 | 3/2022 |
| WO | WO-2022067254 A1 | 3/2022 |
| WO | WO-2022060549 A3 | 4/2022 |
| WO | WO-2022131784 A1 | 6/2022 |
| WO | WO-2022132381 A1 | 6/2022 |
| WO | WO-2022140113 A1 | 6/2022 |
| WO | WO-2022140117 A1 | 6/2022 |
| WO | WO-2022140129 A1 | 6/2022 |
| WO | WO-2022140734 A1 | 6/2022 |
| WO | WO-2022140739 A1 | 6/2022 |
| WO | WO-2022146678 A1 | 7/2022 |
| WO | WO-2025170222 A1 | 8/2022 |
| WO | WO-2022198182 A1 | 9/2022 |
| WO | WO-2022216784 A1 | 10/2022 |
| WO | WO-2022225761 A1 | 10/2022 |
| WO | WO-2022245765 A1 | 11/2022 |
| WO | WO-2023177661 A1 | 9/2023 |
| WO | WO-2024020389 A1 | 1/2024 |
| WO | WO-2024044138 A1 | 2/2024 |
| WO | WO-2025171156 A1 | 8/2025 |

OTHER PUBLICATIONS

"U.S. Appl. No. 18/471,056, Notice of Allowability mailed Aug. 6, 2025", 2 pgs.
"U.S. Appl. No. 18/471,056, Notice of Allowance mailed Jun. 4, 2025", 19 pgs.
"U.S. Appl. No. 18/471,056, Response filed May 13, 2025 to Final Office Action mailed Feb. 13, 2025", 11 pgs.
"European Application Serial No. 21840354.1, Communication Pursuant to Article 94(3) EPC mailed Mar. 11, 2025", 8 pgs.
"European Application Serial No. 21840354.1, Response filed Jul. 10, 2025 to Communication Pursuant to Article 94(3) EPC mailed Mar. 11, 2025", w/ English Claims, 20 pgs.
"European Application Serial No. 21841133.8, Communication Pursuant to Article 94(3) EPC mailed Mar. 28, 2025", 4 pgs.
"European Application Serial No. 21841133.8, Response to Communication pursuant to Rules 161 and 162 EPC filed Jan. 19, 2024", 11 pgs.
"International Application Serial No. PCT/US2023/030711, International Preliminary Report on Patentability mailed Mar. 6, 2025", 6 pgs.

(56)          References Cited

OTHER PUBLICATIONS

"International Application Serial No. PCT/US2025/014828, International Search Report mailed May 14, 2025", 3 pgs.
"International Application Serial No. PCT/US2025/014828, Written Opinion mailed May 14, 2025", 5 pgs.
"Korean Application Serial No. 10-2023-7024042, Notice of Preliminary Rejection mailed Feb. 3, 2025", w/ English translation, 13 pgs.
"Korean Application Serial No. 10-2023-7024042, Response filed Mar. 27, 2025 to Notice of Preliminary Rejection mailed Feb. 3, 2025", w/ current English claims, 29 pgs.
"Korean Application Serial No. 10-2023-7024664, Notice of Preliminary Rejection mailed Mar. 19, 2025", w/ English translation, 11 pgs.
"Korean Application Serial No. 10-2023-7024664, Response filed May 9, 2025 to Notice of Preliminary Rejection mailed Mar. 19, 2025", w/ English Claims, 27 pgs.
"Korean Application Serial No. 10-2023-7024665, Notice of Preliminary Rejection mailed Jul. 9, 2025", w/ English translation, 14 pgs.
"Korean Application Serial No. 10-2023-7024671, Notice of Preliminary Rejection mailed Mar. 19, 2025", W/English Translation, 9 pgs.
"Korean Application Serial No. 10-2023-7024671, Response filed May 13, 2025 to Notice of Preliminary Rejection mailed Mar. 19, 2025", w/ English Claims, 14 pgs.
"Korean Application Serial No. 10-2023-7024672, Notice of Preliminary Rejection mailed Apr. 30, 2025", w/ English translation, 10 pgs.
"Korean Application Serial No. 10-2023-7024672, Response filed Jun. 26, 2025 to Notice of Preliminary Rejection mailed Apr. 30, 2025", w/ English claims, 29 pgs.
"Skype for Business User Guide", [Online]. Retrieved from the Internet: <https://highlandcc.edu/caffeine/jploads/files/1T/Skype%20for%20Business.pdf>, (Mar. 31, 2018), 22 pgs.
Heriot-Watt, "Information Services Skype for Business", (Feb. 2019), 16 pgs.
"U.S. Appl. No. 17/248,981, Non Final Office Action mailed Sep. 30, 2021", 30 pgs.
"U.S. Appl. No. 17/248,981, Notice of Allowance mailed Feb. 16, 2022", 12 pgs.
"U.S. Appl. No. 17/248,981, Response filed Dec. 20, 2021 to Non Final Office Action mailed Sep. 30, 2021", 11 pgs.
"U.S. Appl. No. 17/301,284, Corrected Notice of Allowability mailed Jun. 2, 2022", 2 pgs.
"U.S. Appl. No. 17/301,284, Corrected Notice of Allowability mailed Aug. 23, 2022", 2 pgs.
"U.S. Appl. No. 17/301,284, Non Final Office Action mailed Dec. 14, 2021", 27 pgs.
"U.S. Appl. No. 17/301,284, Notice of Allowance mailed May 20, 2022", 8 pgs.
"U.S. Appl. No. 17/301,284, Response filed Mar. 14, 2022 to Non Final Office Action mailed Dec. 14, 2021", 10 pgs.
"U.S. Appl. No. 17/410,787, Advisory Action mailed Feb. 9, 2024", 4 pgs.
"U.S. Appl. No. 17/410,787, Corrected Notice of Allowability mailed Jan. 11, 2023", 2 pgs.
"U.S. Appl. No. 17/410,787, Examiner Interview Summary mailed Aug. 7, 2024", 3 pgs.
"U.S. Appl. No. 17/410,787, Final Office Action mailed Dec. 27, 2023", 17 pgs.
"U.S. Appl. No. 17/410,787, Non Final Office Action mailed May 20, 2024", 23 pgs.
"U.S. Appl. No. 17/410,787, Non Final Office Action mailled Aug. 17, 2022", 15 pgs.
"U.S. Appl. No. 17/410,787, Non Final Office Action mailed Aug. 29, 2023", 14 pgs.
"U.S. Appl. No. 17/410,787, Notice of Allowance mailed Oct. 10, 2024", 22 pgs.

"U.S. Appl. No. 17/410,787, Notice of Allowance mailed Dec. 29, 2022", 12 pgs.
"U.S. Appl. No. 17/410,787, Response filed Jan. 31, 2024 to Final Office Action mailed Dec. 27, 2023", 11 pgs.
"U.S. Appl. No. 17/410,787, Response filed Aug. 12, 2024 to Non Final Office Action mailed May 20, 2024", 10 pgs.
"U.S. Appl. No. 17/410,787, Response filed Nov. 1, 2023 to Non Final Office Action mailed Aug. 29, 2023", 10 pgs.
"U.S. Appl. No. 17/410,787, Response filed Nov. 4, 2022 to Non Final Office Action mailed Aug. 17, 2022", 9 pgs.
"U.S. Appl. No. 17/410,787, Supplemental Notice of Allowability mailed Oct. 29, 2024", 5 pgs.
"U.S. Appl. No. 17/410,814, 312 Amendment filed Aug. 25, 2023", 3 pgs.
"U.S. Appl. No. 17/410,814, Advisory Action mailed Apr. 17, 2023", 5 pgs.
"U.S. Appl. No. 17/410,814, Advisory Action mailed Aug. 30, 2022", 4 pgs.
"U.S. Appl. No. 17/410,814, Final Office Action mailed Feb. 8, 2023", 24 pgs.
"U.S. Appl. No. 17/410,814, Final Office Action mailed Jun. 7, 2022", 21 pgs.
"U.S. Appl. No. 17/410,814, Non Final Office Action mailed Jan. 12, 2022", 22 pgs.
"U.S. Appl. No. 17/410,814, Non Final Office Action mailed Oct. 3, 2022", 21 pgs.
"U.S. Appl. No. 17/410,814, Notice of Allowance mailed May 25, 2023", 11 pgs.
"U.S. Appl. No. 17/410,814, Response filed Mar. 30, 2022 to Non Final Office Action mailed Jan. 12, 2022", 13 pgs.
"U.S. Appl. No. 17/410,814, Response filed Apr. 6, 2023 to Final Office Action malled Feb. 8, 2023", Response to Final Office Action, 13 pgs.
"U.S. Appl. No. 17/410,814, Response filed Apr. 19, 2023 to Advisory Action mailed aPR. 17, 2023", 13 pgs.
"U.S. Appl. No. 17/410,814, Response filed Aug. 5, 2022 to Final Office Action mailed Jun. 7, 2022", 11 pgs.
"U.S. Appl. No. 17/410,814, Response filed Dec. 30, 2022 to Non Final Office Action mailed Oct. 3, 2022", 11 pgs.
"U.S. Appl. No. 17/410,814, Supplemental Notice of Allowability mailed Jun. 29, 2023", 8 pgs.
"U.S. Appl. No. 17/445,767, Advisory Action mailed Mar. 17, 2023", 2 pgs.
"U.S. Appl. No. 17/445,767, Final Office Action mailed Feb. 9, 2023", 26 pgs.
"U.S. Appl. No. 17/445,767, Final Office Action mailed Sep. 13, 2023", 30 pgs.
"U.S. Appl. No. 17/445,767, Non Final Office Action mailed Jun. 1, 2023", 25 pgs.
"U.S. Appl. No. 17/445,767, Non Final Office Action mailed Sep. 9, 2022", 25 pgs.
"U.S. Appl. No. 17/445,767, Response filed Mar. 7, 2023 to Non Final Office Action mailed Sep. 9, 2022", 10 pgs.
"U.S. Appl. No. 17/445,767, Response filed Sep. 1, 2023 to Non Final Office Action mailed Jun. 1, 2023", 13 pgs.
"U.S. Appl. No. 17/445,767, Response filed Dec. 7, 2022 to Non Final Office Action mailed Sep. 9, 2022", 11 pgs.
"U.S. Appl. No. 17/445,772, Advisory Action mailed Feb. 10, 2023", 3 pgs.
"U.S. Appl. No. 17/445,772, Advisory Action mailed Nov. 17, 2023", 3 pgs.
"U.S. Appl. No. 17/445,772, Corrected Notice of Allowability mailed Jun. 10, 2024", 3 pgs.
"U.S. Appl. No. 17/445,772, Final Office Action mailed Sep. 22, 2023", 46 pgs.
"U.S. Appl. No. 17/445,772, Final Office Action mailed Dec. 1, 2022", 42 pgs.
"U.S. Appl. No. 17/445,772, Non Final Office Action mailed Jan. 10, 2024", 45 pgs.
"U.S. Appl. No. 17/445,772, Non Final Office Action mailed Mar. 10, 2023", 36 pgs.
"U.S. Appl. No. 17/445,772, Non Final Office Action malled Jun. 17, 2022", 38 pgs.

(56) References Cited

OTHER PUBLICATIONS

"U.S. Appl. No. 17/445,772, Notice of Allowance mailed May 29, 2024", 15 pgs.

"U.S. Appl. No. 17/445,772, Response filed Jan. 31, 2023 to Final Office Action mailed Dec. 1, 2022", 12 pgs.

"U.S. Appl. No. 17/445,772, Response filed Mar. 26, 2024 to Non Final Office Action mailed Jan. 10, 2024", 14 pgs.

"U.S. Appl. No. 17/445,772, Response filed Jun. 9, 2023 to Non Final Office Action mailed Mar. 10, 2023", 14 pgs.

"U.S. Appl. No. 17/445,772, Response filed Sep. 16, 2022 to Non Final Office Action mailed Jun. 17, 2022", 11 pgs.

"U.S. Appl. No. 17/445,772, Response filed Nov. 8, 2023 to Final Office Action mailed Sep. 22, 2023", 13 pgs.

"U.S. Appl. No. 17/445,774, Advisory Action mailed Mar. 9, 2023", 6 pgs.

"U.S. Appl. No. 17/445,774, Corrected Notice of Allowability mailed Jul. 6, 2023", 2 pgs.

"U.S. Appl. No. 17/445,774, Final Office Action malled Dec. 22, 2022", 29 pgs.

"U.S. Appl. No. 17/445,774, Non Final Office Action mailed Jul. 13, 2022", 26 pgs.

"U.S. Appl. No. 17/445,774, Notice of Allowance mailed Jun. 22, 2023", 20 pgs.

"U.S. Appl. No. 17/445,774, Response filed Feb. 22, 2023 to Final Office Action mailed Dec. 22, 2022", 10 pgs.

"U.S. Appl. No. 17/445,774, Response filed Oct. 12, 2022 to Non Final Office Action mailed Jul. 13, 2022", 12 pgs.

"U.S. Appl. No. 17/655,125, Final Office Action mailed Apr. 25, 2023", 21 pgs.

"U.S. Appl. No. 17/655,125, Final Office Action mailed Nov. 15, 2023", 23 pgs.

"U.S. Appl. No. 17/655,125, Non Final Office Action mailed Jul. 24, 2023", 22 pgs.

"U.S. Appl. No. 17/655,125, Non Final Office Action mailed Nov. 8, 2022", 20 pgs.

"U.S. Appl. No. 17/655,125, Response filed Feb. 8, 2023 to Non Final Office Action mailed Nov. 8, 2022", 12 pgs.

"U.S. Appl. No. 17/655,125, Response filed Jun. 29, 2023 to Final Office Action mailed Apr. 25, 2023", 11 pgs.

"U.S. Appl. No. 17/655,125, Response filed Oct. 24, 2023 to Non Final Office Action mailed Jul. 24, 2023", 11 pgs.

"U.S. Appl. No. 17/663,594, Advisory Action mailed Jun. 7, 2023", 4 pgs.

"U.S. Appl. No. 17/663,594, Examiner Interview Summary mailed Jun. 27, 2023", 2 pgs.

"U.S. Appl. No. 17/663,594, Final Office Action malled Apr. 4, 2023", 51 pgs.

"U.S. Appl. No. 17/663,594, Non Final Office Action mailed Sep. 29, 2022", 65 pgs.

"U.S. Appl. No. 17/663,594, Notice of Allowability mailed Jan. 3, 2024", 3 pgs.

"U.S. Appl. No. 17/663,594, Notice of Allowance malled Aug. 9, 2023", 14 pgs.

"U.S. Appl. No. 17/663,594, Response filed May 9, 2023 to Final Office Action malled Apr. 4, 2023", 12 pgs.

"U.S. Appl. No. 17/663,594, Response filed Jun. 29, 2023 to Advisory Action mailed Jun. 7, 2023", 13 pgs.

"U.S. Appl. No. 17/663,594, Response filed Dec. 29, 2022 to Non Final Office Action mailed Sep. 29, 2022", 11 pgs.

"U.S. Appl. No. 17/821,741, Corrected Notice of Allowability mailed Aug. 11, 2023", 2 pgs.

"U.S. Appl. No. 17/821,741, Non Final Office Action mailed Mar. 8, 2023", 15 pgs.

"U.S. Appl. No. 17/821,741, Notice of Allowance malled Jul. 28, 2023", 8 pgs.

"U.S. Appl. No. 17/821,741, Response filed Jun. 8, 2023 to Non Final Office Action mailed Mar. 8, 2023", 12 pgs.

"U.S. Appl. No. 17/893,696, Corrected Notice of Allowability mailed Dec. 27, 2024", 5 pgs.

"U.S. Appl. No. 17/893,696, Examiner Interview Summary mailed Jul. 1, 2024", 2 pgs.

"U.S. Appl. No. 17/893,696, Final Office Action mailed May 3, 2024", 15 pgs.

"U.S. Appl. No. 17/893,696, Non Final Office Action malled Jan. 12, 2024", 16 pgs.

"U.S. Appl. No. 17/893,696, Notice of Allowance mailed Aug. 21, 2024", 11 pgs.

"U.S. Appl. No. 17/893,696, Notice of Allowance mailed Dec. 2, 2024", 8 pgs.

"U.S. Appl. No. 17/893,696, Response filed Feb. 27, 2024 to Non Final Office Action mailed Jan. 12, 2024", 11 pgs.

"U.S. Appl. No. 17/893,696, Response filed Jul. 3, 2024 to Final Office Action mailed May 3, 2024", 9 pgs.

"U.S. Appl. No. 17/895,449, Non Final Office Action mailed Jun. 8, 2023", 9 pgs.

"U.S. Appl. No. 17/895,449, Notice of Allowance mailed Dec. 7, 2023", 9 pgs.

"U.S. Appl. No. 17/895,449, Response filed Aug. 16, 2023 to Non Final Office Action mailed Jun. 8, 2023", 10 pgs.

"U.S. Appl. No. 17/895,449, Supplemental Notice of Allowability mailed Dec. 21, 2023", 2 pgs.

"U.S. Appl. No. 18/456,286, Notice of Allowance mailed Jul. 3, 2024", 23 pgs.

"U.S. Appl. No. 18/456,286, Supplemental Notice of Allowability mailed Jul. 18, 2024", 2 pgs.

"U.S. Appl. No. 18/471,056, Examiner Interview Summary mailed Nov. 22, 2024", 2 pgs.

"U.S. Appl. No. 18/471,056, Non Final Office Action mailed Jun. 12, 2024", 20 pgs.

"U.S. Appl. No. 18/471,056, Non Final Office Action mailed Sep. 13, 2024", 30 pgs.

"U.S. Appl. No. 18/471,056, Response filed Aug. 13, 2024 to Non Final Office Action mailed Jun. 12, 2024", 10 pgs.

"U.S. Appl. No. 18/471,056, Response filed Nov. 20, 2024 to Non Final Office Action mailed Sep. 13, 2024", 10 pgs.

"Bitmoji", Snapchat Support, [Online] Retrieved from the Internet: <URL: https://web.archive.org/web/20190503063620/https://support. snapchat.com/en-US/a/bitmoji>, (captured May 3, 2019), 2 pgs.

"Bitmoji Chrome Extension", [Online] Retrieved from the Internet: <URL: https://web.archive.org/web/20200919024925/https://support. bimoji.com/hc/en-us/articles/360001494066>, (Sep. 19, 2020), 5 pgs.

"Bitmoji Customize text", [Online] Retrieved from the Internet: <URL: https://web.archive.org/web/20210225200456/https://support. bitmoji.com/hc/en-us/articles/360034632291-Customize-Text-on-Bitmoji-Stickers>, (captured Feb. 25, 2021), 3 pgs.

"Bitmoji Family", Snapchat Support, [Online] Retrieved from the Internet: <URL: https://web.archive.org/web/20190503063620/ https://support.snapchat.com/en-US/article/bitmoji-family>, (captured May 3, 2019), 4 pgs.

"Instant Comics Starring You & Your Friends", Bitstrips Inc, [Online] Retrieved from the Internet: <URL: https://web.archive. org/web/20150206000940/http://company.bitstrips.com/bitstrips-app. html>, (captured Feb. 6, 2015), 3 pgs.

"International Application Serial No. PCT/US2021/049672, International Preliminary Report on Patentability mailed Mar. 23, 2023", 17 pgs.

"International Application Serial No. PCT/US2021/049672, International Search Report mailed Mar. 9, 2022", 6 pgs.

"International Application Serial No. PCT/US2021/049672, Invitation to Pay Additional Fees mailed Jan. 14, 2022", 15 pgs.

"International Application Serial No. PCT/US2021/049672, Written Opinion mailed Mar. 9, 2022", 15 pgs.

"International Application Serial No. PCT/US2021/063307, International Preliminary Report on Patentability mailed Jul. 6, 2023", 12 pgs.

"International Application Serial No. PCT/US2021/063307, International Search Report mailed May 12, 2022", 6 pgs.

"International Application Serial No. PCT/US2021/063307, Invitation to Pay Additional Fees malled Mar. 21, 2022", 12 pgs.

"International Application Serial No. PCT/US2021/063307, Written Opinion mailed May 12, 2022", 10 pgs.

(56)　　　　　References Cited

OTHER PUBLICATIONS

"International Application Serial No. PCT/US2021/063350, International Preliminary Report on Patentability mailed Jul. 6, 2023", 7 pgs.
"International Application Serial No. PCT/US2021/063350, International Search Report mailed Apr. 5, 2022", 4 pgs.
"International Application Serial No. PCT/US2021/063350, Written Opinion malled Apr. 5, 2022", 5 pgs.
"International Application Serial No. PCT/US2021/063553, International Preliminary Report on Patentability mailed Jul. 6, 2023", 10 pgs.
"International Application Serial No. PCT/US2021/063553, International Search Report mailed Mar. 18, 2022", 4 pgs.
"International Application Serial No. PCT/US2021/063553, Written Opinion mailed Mar. 18, 2022", 8 pgs.
"International Application Serial No. PCT/US2021/072864, International Preliminary Report on Patentability mailed Jul. 6, 2023", 9 pgs.
"International Application Serial No. PCT/US2021/072864, International Search Report mailed Mar. 29, 2022", 4 pgs.
"International Application Serial No. PCT/US2021/072864, Written Opinion mailed Mar. 29, 2022", 7 pgs.
"International Application Serial No. PCT/US2021/072959, International Preliminary Report on Patentability malled Jul. 6, 2023", 9 pgs.
"International Application Serial No. PCT/US2021/072959, International Search Report mailed Apr. 5, 2022", 5 pgs.
"International Application Serial No. PCT/US2021/072959, Written Opinion mailed Apr. 5, 2022", 7 pgs.
"International Application Serial No. PCT/US2023/015179, International Search Report mailed Aug. 21, 2023", 4 pgs.
"International Application Serial No. PCT/US2023/015179, Written Opinion mailed Aug. 21, 2023", 4 pgs.
"International Application Serial No. PCT/US2023/029814, International Search Report mailed Jan. 9, 2024", 6 pgs.
"International Application Serial No. PCT/US2023/029814, Invitation to Pay Additional Fees mailed Nov. 9, 2023", 6 pgs.
"International Application Serial No. PCT/US2023/029814, Written Opinion mailed Jan. 9, 2024", 8 pgs.
"International Application Serial No. PCT/US2023/030711, International Search Report mailed Dec. 12, 2023", 3 pgs.
"International Application Serial No. PCT/US2023/030711, Written Opinion mailed Dec. 12, 2023", 4 pgs.
"International Application Serial No. PCT/US2023/030818, International Search Report mailed Nov. 28, 2023", 3 pgs.
"International Application Serial No. PCT/US2023/030818, Written Opinion mailed Nov. 28, 2023", 5 pgs.
"International Application Serial No. PCT/US2023/034437, International Search Report mailed Dec. 13, 2023", 4 pgs.
"International Application Serial No. PCT/US2023/034437, Written Opinion mailed Dec. 13, 2023", 6 pgs.
"International Application Serial No. PCT/US2023/070415, International Search Report mailed Nov. 3, 2023", 5 pgs.
"International Application Serial No. PCT/US2023/070415, Written Opinion mailed Nov. 3, 2023", 4 pgs.
"Manage Your Bitmoji", Snapchat Support, [Online] Retrieved from the Internet: <URL: https://web.archive.org/web/20190503063620/https://support.snapchat.com/en-US/a/manage-bitmoji>, (captured May 3, 2019), 3 pgs.
"Skype for Business User Guide", Information Services, Heriot-Watt University, UK, [Online] Retrieved from the Internet: <URL:https:// www.hw.ac.uk/services/docs/is/skypeforbusinessuserguidev2.0.pdf>, [retrieved on Apr. 12, 2022], (2019), 16 pgs.
"Your Own Personal Emoji", Bitstrips Inc, [Online] Retrieved from the Internet: <URL: https://web.archive.org/web/20150205232004/http://bitmoji.com/>, (captured Feb. 5, 2015), 3 pgs.
Carnahan, Daniel, "Snap is Offering Personalized Video Content Through Bitmoji TV", Business Insider, [Online] Retrieved from the Internet: <URL: https://www.businessinsider.com/snap-offers-personalized-video-content-through-bitmoji-tv-2019-12>, (2019), 10 pgs.
Constine, Josh, "Snapchat launches Bitmoji merch and comic strips starring your avatar", TechCrunch, [Online] Retrieved from the Internet: <URL: https://techcrunch.com/2018/11/13/bitmoji-store/>, (Nov. 13, 2018), 16 pgs.
Constine, Josh, "Snapchat Launches Bitmoji TV: Zany 4-min Cartoons of Your Avatar", TechCrunch, [Online] Retrieved from the Internet: <URL: https://techcrunch.com/2020/01/30/bitmoji-tv/>, (Jan. 30, 2020), 13 pgs.
Macmillan, Douglas, "Snapchat Buys Bitmoji App for More Than $100 Million", The Wallstreet Journal, [Online] Retrieved from the Internet: <URL: https://www.wsj.com/articles/snapchat-buys-bitmoji-app-for-more-than-100-million-1458876017>, (Mar. 25, 2016), 5 pgs.
Newton, Casey, "Your Snapchat friendships now have their own profiles—and merchandise", The Verge, [Online] Retrieved from the Internet: <URL: https://www.theverge.com/2018/11/13/18088772/snapchat-friendship-profiles-bitmoji-merchandise-comics>, (Nov. 13, 2018), 5 pgs.
Ong, Thuy, "Snapchat takes Bitmoji deluxe with hundreds of new customization options", The Verge, [Online] Retrieved from the Internet on Nov. 2, 2018: <URL: https://www.theverge.com/2018/1/30/16949402/bitmoji-deluxe-snapchat-customization>, (Jan. 30, 2018), 2 pgs.
Reign, Ashley, "How to Add My Friend's Bitmoji to My Snapchat", Women.com, [Online] Retrieved from the Internet: <URL: https://www.women.com/ashleyreign/lists/how-to-add-my-friends-bitmoji-to-my-snapchat>, (Jun. 30, 2017), 7 pgs.
Tumbokon, Karen, "Snapchat Update: How to Add Bitmoji to Customizable Geofilters", International Business Times, [Online] Retrieved from the Internet : <URL: https://www.ibtimes.com/snapchat-update-how-add-bitmoji-customizable-geofilters-2448152>, (Nov. 18, 2016), 6 pgs.
Wang, Wallace, "Mac OS X for Absolute Beginners", Apress, (2016), 507 pgs.
"European Application Serial No. 21841133.8, Response filed Jul. 18, 2025 to Communication Pursuant to Article 94(3) EPC mailed Mar. 28, 2025", 18 pgs.
"U.S. Appl. No. 18/471,056, 312 Amendment filed Sep. 4, 2025", 9 pgs.
"European Application Serial No. 23857957.7, Response to Communication pursuant to Rules 161(2) and 162 EPC filed Sep. 12, 2025", 12 pgs.
"U.S. Appl. No. 18/471,056, Corrected Notice of Allowability mailed Sep. 16. 2025", 2 pgs.
"U.S. Appl. No. 18/471,056, PTO Response to Rule 312 Communication mailed Sep. 16, 2025", 2 pgs.
"Korean Application Serial No. 10-2023-7024671, Final Office Action mailed Nov. 24, 2025", w/ English translation, 7 pgs.
"European Application Serial No. 23857957.7, Extended European Search Report mailed Apr. 23, 2026", 9 pgs.

* cited by examiner

500

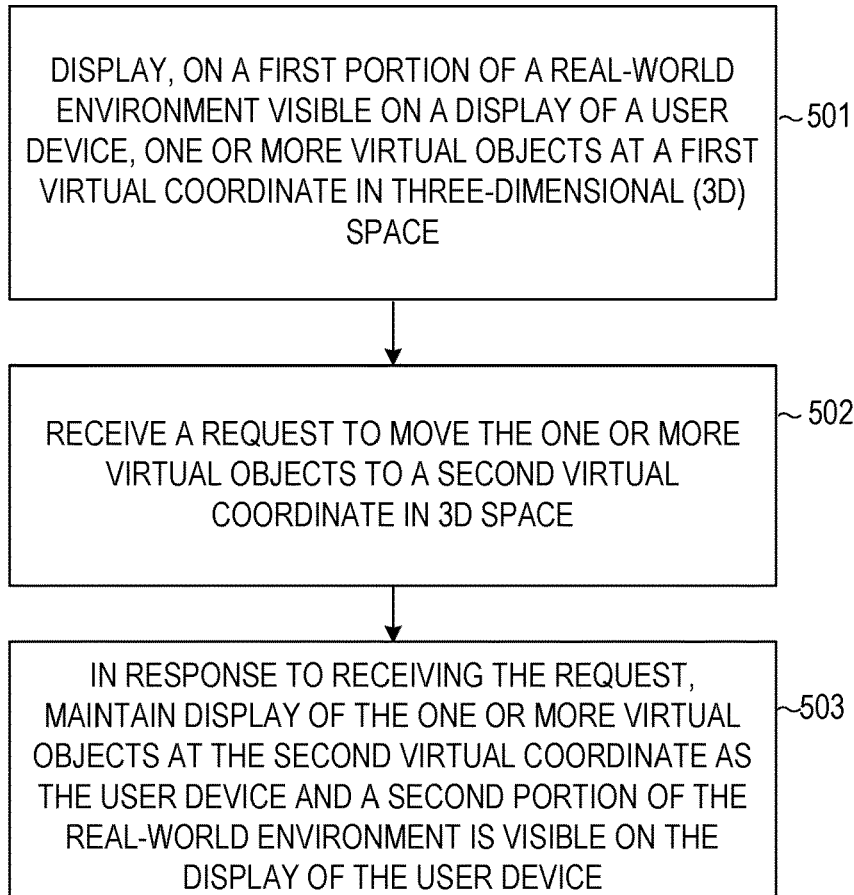

DISPLAY, ON A FIRST PORTION OF A REAL-WORLD ENVIRONMENT VISIBLE ON A DISPLAY OF A USER DEVICE, ONE OR MORE VIRTUAL OBJECTS AT A FIRST VIRTUAL COORDINATE IN THREE-DIMENSIONAL (3D) SPACE    ~501

RECEIVE A REQUEST TO MOVE THE ONE OR MORE VIRTUAL OBJECTS TO A SECOND VIRTUAL COORDINATE IN 3D SPACE    ~502

IN RESPONSE TO RECEIVING THE REQUEST, MAINTAIN DISPLAY OF THE ONE OR MORE VIRTUAL OBJECTS AT THE SECOND VIRTUAL COORDINATE AS THE USER DEVICE AND A SECOND PORTION OF THE REAL-WORLD ENVIRONMENT IS VISIBLE ON THE DISPLAY OF THE USER DEVICE    ~503

MAINTAINING AR/VR CONTENT AT A RE-DEFINED POSITION

FIELD OF USE

This disclosure relates to augmented reality devices.

BACKGROUND

Some electronics-enabled eyewear devices, such as so-called smart glasses, allow users to interact with virtual content while a user is engaged in some activity. Users wear the eyewear devices and can view a real-world environment through the eyewear devices while interacting with virtual content that is displayed by the eyewear devices.

BRIEF DESCRIPTION OF THE DRAWINGS

Various ones of the appended drawings merely illustrate examples of the present disclosure and should not be considered as limiting its scope.

FIG. 5 is a flowchart showing example operations of the content centering system according to an example.

DETAILED DESCRIPTION

Figure 1:
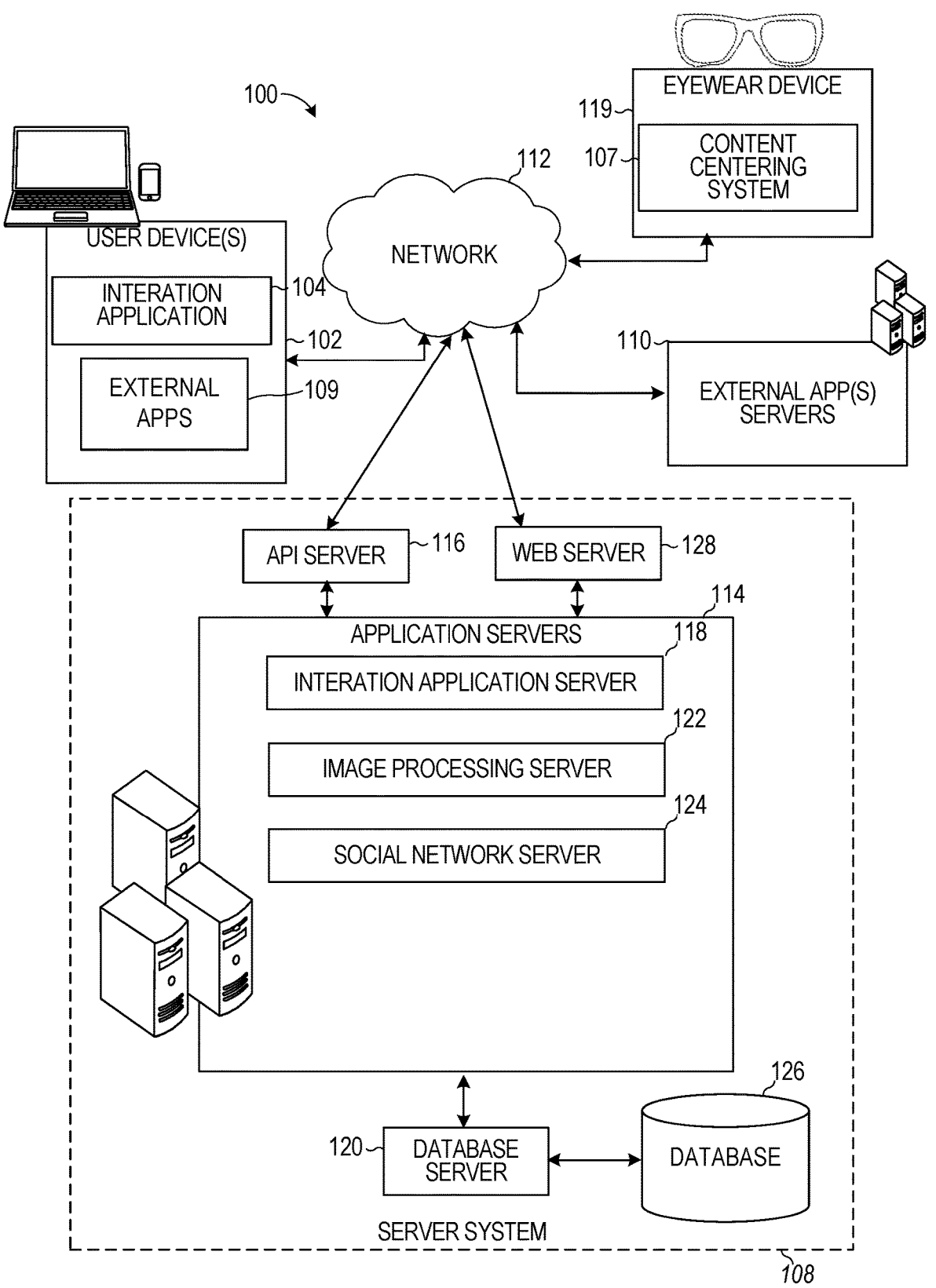
FIG. 1 is a diagrammatic representation of a networked environment in which the present disclosure may be deployed, in accordance with some examples.

The description that follows discusses illustrative examples of the disclosure. In the following description, for the purposes of explanation, numerous specific details are set forth in order to provide an understanding of various examples of the disclosed subject matter. It will be evident, however, to those skilled in the art, that examples of the disclosed subject matter may be practiced without these specific details. In general, well-known instruction instances, protocols, structures, and techniques are not necessarily shown in detail.

Typical smart glass platforms allow users to read their text messages within the smart glasses as well as interact with other types of virtual content. Such platforms are configured to display the virtual content in the lenses of the smart glasses. While such systems work well to generally allow users to interact with virtual content, such devices fail to consider movement of the user through the real-world environment in the display of the virtual content. In addition, such virtual content is usually positioned, fixed, in the real world and can be left behind or lost, as the user moves to a different real world position. Even though this is how real world objects behave, in virtual spaces, this can feel inconvenient, confusing, and frustrating.

Some systems continuously display the virtual content as the user moves around the real-world environment but doing so does not always make sense and can end up inundating the user with too much information making such presentation counterproductive. Namely, such devices fail to selectively determine whether or not to continue to display virtual content within a current view of the real-world environment as the user moves around which, in turn, ends up frustrating the user and ends up distracting the user from activities they are performing. Depending on its constraints/tuning, this behavior can also be uncomfortable and feel claustrophobic, such as if the virtual content directly 1:1 follows the user's head motion. Also if the content 1:1 follows the user as they move around the real world, and it is a large size, and if it is not adjustable, the content can also block the user's view, and distract them from real world obstacles/information Some smart glass platforms display the virtual content at predefined default positions in three-dimensional (3D) space. These positions are set to be a certain virtual distance from the smart glasses (e.g., the user's face) and at a certain virtual height above the real-world surface being viewed through the smart glasses. The positions are selected by a provider or developer of the AR content to be comfortable for most users. However, some users have different physical reach capabilities (e.g., because they have longer or shorter arms) and so the default positions may not be the most appealing for these users. These users often get frustrated in having to reach too far into virtual space to make certain selections or interact with the virtual content. The typical smart glass platforms fail to provide a means for users to specify or define a comfortable level of distance and height for virtual objects, which causes the users to constantly interact with virtual content in an uncomfortable manner.

In addition, the typical way of presenting the virtual content in the lenses of the smart glasses ends up consuming a great deal of processing and battery resources. This is because such devices use standard, resource-intensive programming languages and operations to process the virtual content and further use additional resources to generate such virtual content for display. As a result, the battery life of these typical smart glasses is very limited, requiring a user to constantly charge the smart glasses for use, which takes away from the appeal and interest of using the smart glasses.

The disclosed examples improve the efficiency of using the electronic device by allowing users to re-define where virtual content is positioned relative to a user in virtual 3D space. The disclosed examples provide a solution that improves comfort for the user in navigating virtual content by allowing the user to comfortably reach UI elements with hand gestures. Also, the experience is improved since the user always knows where the UI is positioned in virtual space and so the virtual content cannot be lost as the user moves around. The disclosed examples improve safety of AR devices by providing a reliable way to control inputs for user interfaces that contain critical privacy UI controls like mute/camera off. The disclosed techniques enable the electronic device (AR device) to customize the default display positions for virtual content to each user's needs and based on the physical attributes of each user. This way, the user can comfortably interact with the virtual content using hand gestures or other input modalities. Specifically, the disclosed techniques enable users to refine or adjust the position of their virtual content after the virtual content has been initially defined by the system to follow the AR device position. This adjusted position can then be saved/cached/ restored for future sessions. A single predefined position for virtual content following a user can be uncomfortable for hand interactions for different-sized users. Thus, the disclosed examples allow for additional movement, adjustment of virtual content, while keeping the virtual content visible in the field-of-view (FOV) of the user, which can be helpful and increases user comfort in operating these interfaces.

Namely, the disclosed examples display, on a first portion of a real-world environment visible on a display of a user device, one or more virtual objects at a first virtual coordinate in 3D space. The disclosed examples receive a request to move the one or more virtual objects to a second virtual coordinate in 3D space. The disclosed examples, in response to receiving the request, maintain a display of the one or more virtual objects at the second virtual coordinate as a second portion of the real-world environment becomes visible on the display of the user device. Specifically, interacting with virtual content while moving around a real-world environment can cause users to lose track of where the virtual content (e.g., virtual menus) is placed. The disclosed examples ensure that the virtual content is maintained in a visible FOV in a comfortable manner so the user can always interact with the virtual content in a non-disruptive manner.

Because the processor of the eyewear device executes a low-power process to selectively bring into view virtual objects that are displayed within a real-world environment, the battery life of the electronic eyewear device is enhanced. This increases the efficiency, appeal, and utility of electronic eyewear devices. The virtual content can both follow the user and is moveable by the user (e.g., using hand gestures) with constraints to remain visible within the FOV of the user which is useful for user comfort, user convenience and user safety.

Networked Computing Environment

FIG. 1 is a block diagram showing an example system 100 for exchanging data (e.g., messages and associated content) over a network. The system 100 includes multiple instances of a user device 102, each of which hosts a number of applications, including an interaction application 104 and other external applications 109 (e.g., third-party applications). Each interaction application 104 is communicatively coupled to other instances of the interaction application 104 (e.g., hosted on respective other user devices 102, sometimes referred to as user system(s)), a server system 108 and external app(s) servers 110 via a network 112 (e.g., the Internet). An interaction application 104 can also communicate with locally-hosted third-party applications 109 using Applications Program Interfaces (APIs). The system 100 includes an eyewear device 119, which hosts a content centering system 107, among other applications. The eyewear device 119 is communicatively coupled to the user device 102 via the network 112 (which may include via a dedicated short-range communication path, such as a Bluetooth™ or WiFi direct connection).

The content centering system 107 automatically or selectively moves augmented reality or virtual reality content items from one virtual position to another as the user moves around the eyewear device 119. For example, the user or wearer of the eyewear device 119 may initially be looking at a first portion of a real-world environment (e.g., a first room in a house). The user may provide input (e.g., using a user device 102 or a voice-activated or touch-activated interface of the eyewear device 119) to launch or access virtual content that includes one or more virtual objects. Specifically, the user can request to access a music or video library. In response, a list of thumbnails or visual indicators of the media assets associated with a music or video library is retrieved and presented within view of the first portion of the real-world environment. Other virtual content can also be presented, such as menu items or any other content item that can be used to control other content items being displayed or accessed.

In an example, the content centering system 107 assigns a first virtual location to the virtual content. The first virtual location corresponds to a position in three-dimensional (3D) space at which the first portion of the real-world environment exists. The content centering system 107 displays the virtual content at the first virtual location so that the virtual content is visible to the user as the user views the first portion of the real-world environment through lenses of the eyewear device 119 (or other AR display device). In one case, the virtual content includes user interface elements for controlling playback of content. In such cases, the user can interact with the virtual content to playback, stop, skip or control consumption of the media assets. In another case, the virtual content includes user interface elements for generating augmented reality content. In such cases, the user can interact with the virtual content to add augmented reality items or elements to a view of the eyewear device 119 (e.g., the user can add virtual paint to a real-world scene the user is viewing through the eyewear device 119). Any functionality described herein with respect to the eyewear device 119 can similarly be applied or performed by the user device 102 or other AR/VR device.

While the media assets are being played back and displayed at the first virtual location, the user can turn their head or walk to another real-world location (e.g., a second portion of the real-world environment, such as another room in the house). The other real-world location may include some or none of the real-world objects that are within view of the first portion of the real-world location. The virtual content that was displayed at the first virtual location is moved to the new location so that the virtual content is persistently displayed for the user to interact with the virtual content.

In some cases, the virtual content is initially displayed at an initial or default virtual location. This virtual location can be at a first virtual distance from the user or the eyewear device 119 and at a first virtual height relative to the real-world surface that appears through the lenses of the eyewear device 119. The eyewear device 119 can receive input from the user that moves the virtual content in 3D space closer or farther from the user or a point (e.g., the lenses) of the eyewear device 119 (e.g., along the z-axis), moves the virtual content up/down relative to the real-world surface (e.g., along the y-axis), and/or moves the virtual content left/right relative to the user or the point of the eyewear device 119. In such cases, the content centering system 107 computes a virtual offset that represents the new virtual position of the virtual content relative to the user or point on the eyewear device 119. The content centering system 107 can maintain display of the virtual content at the same virtual offset relative to the user and/or point on the eyewear device 119 as the user moves around to view other portions of the real-world environment. This way, the user can continuously interact with the virtual content as the user moves around and the virtual content is displayed at a convenient location for the user.

In some cases, the content centering system 107 receives input from the user that drags the virtual content to a new virtual position that is outside of the field-of-view (FOV) of the eyewear device 119. This can be a point where cameras of the eyewear device 119 no longer have a corresponding real-world coordinate in the images being captured that corresponds to the virtual position to which the virtual content has been moved. The content centering system 107 can receive input that presses or otherwise selects the virtual content and drags the virtual content to the new virtual position. In response to receiving input that releases the virtual content and/or sets the virtual content at the new virtual position, the content centering system 107 automatically re-centers the virtual content at a predetermined or user-specified position that is within the FOV of the eyewear device 119. This way, if the user moves virtual content out of view, the virtual content is automatically brought back into view. In some cases, the virtual content is brought back into view to a virtual position that is computed based on the previously computed virtual offset relative to the point on the eyewear device 119 or the user.

In some cases, the content centering system 107 applies the same virtual offset to other virtual content that is retrieved and displayed on the eyewear device 119. For example, the content centering system 107 can receive input that requests a new menu item to be virtually presented in the lenses of the eyewear device 119. In response, the content centering system 107 obtains the new menu item and retrieves a default virtual coordinate that is associated with the new menu item. The virtual coordinate is a position in a virtual space frame of reference of the eye wear device 119 that defines the height and distance and left/right position at which to present virtual content. The content centering system 107 can determine whether the default virtual coordinate corresponds to the virtual offset associated with the user. In response to determining that the default virtual coordinate fails to correspond to the virtual offset associated with the user, the content centering system 107 updates or modifies the default virtual coordinate associated with the new menu item to match the virtual offset associated with the user. This way, the new menu item is presented at the same or substantially the same virtual height relative to the real-world surface and/or same virtual distance from the point on the eyewear device 119 as the virtual content that was previously displayed and moved by the user. The content centering system 107 can update the default display positions of all virtual content items or all virtual content items that are of the same or similar type as the virtual content based on the virtual offset that was previously computed.

The interaction application 104 is able to communicate and exchange data with other interaction applications 104, the eyewear device 119, and with the server system 108 via the network 112. The data exchanged between interaction applications 104, and between the interaction application 104 and the server system 108, includes functions (e.g., commands to invoke functions) as well as payload data (e.g., text, audio, video, or other multimedia data).

The server system 108 provides server-side functionality via the network 112 to an interaction application 104. While certain functions of the system 100 are described herein as being performed by either an interaction application 104 or by the server system 108, the location of certain functionality either within the interaction application 104 or the server system 108 may be a design choice. For example, it may be technically preferable to initially deploy certain technology and functionality within the server system 108 but to later migrate this technology and functionality to the interaction application 104 where a user device 102 has sufficient processing capacity.

The server system 108 supports various services and operations that are provided to the interaction application

104. Such operations include transmitting data to, receiving data from, and processing data generated by the interaction application 104. This data may include message content, client device information, geolocation information, media augmentation and overlays, message content persistence conditions, social network information, and live event information, as examples. Data exchanges within the system 100 are invoked and controlled through functions available via user interfaces (UIs) of the interaction application 104.

Turning now specifically to the server system 108, an API server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the user device 102 and the application servers 114. Specifically, the Application Program Interface (API) server 116 provides a set of interfaces (e.g., routines and protocols) that can be called or queried by the interaction application 104 in order to invoke functionality of the application servers 114. The Application Program Interface (API) server 116 exposes various functions supported by the application servers 114, including account registration, login functionality, the sending of messages, via the application servers 114, from a particular interaction application 104 to another interaction application 104, the sending of media files (e.g., images or video) from a interaction application 104 to a interaction application server 118, and for possible access by another interaction application 104, the settings of a collection of media data (e.g., story), the retrieval of a list of friends of a user of a user device 102, the retrieval of such collections, the retrieval of messages and content, the addition and deletion of entities (e.g., friends) to an entity graph (e.g., a social graph), the location of friends within a social graph, and opening an application event (e.g., relating to the interaction application 104).

The application servers 114 host a number of server applications and subsystems, including for example an interaction application server 118, an image processing server 122, and a social network server 124. The interaction application server 118 implements a number of message processing technologies and functions, particularly related to the aggregation and other processing of content (e.g., textual and multimedia content) included in messages received from multiple instances of the interaction application 104. As will be described in further detail, the text and media content from multiple sources may be aggregated into collections of content (e.g., called stories or galleries). These collections are then made available to the interaction application 104. Other processor- and memory-intensive processing of data may also be performed server-side by the interaction application server 118, in view of the hardware requirements for such processing.

The application servers 114 also include an image processing server 122 that is dedicated to performing various image processing operations, typically with respect to images or video within the payload of a message sent from or received at the interaction application server 118.

Figure 2:
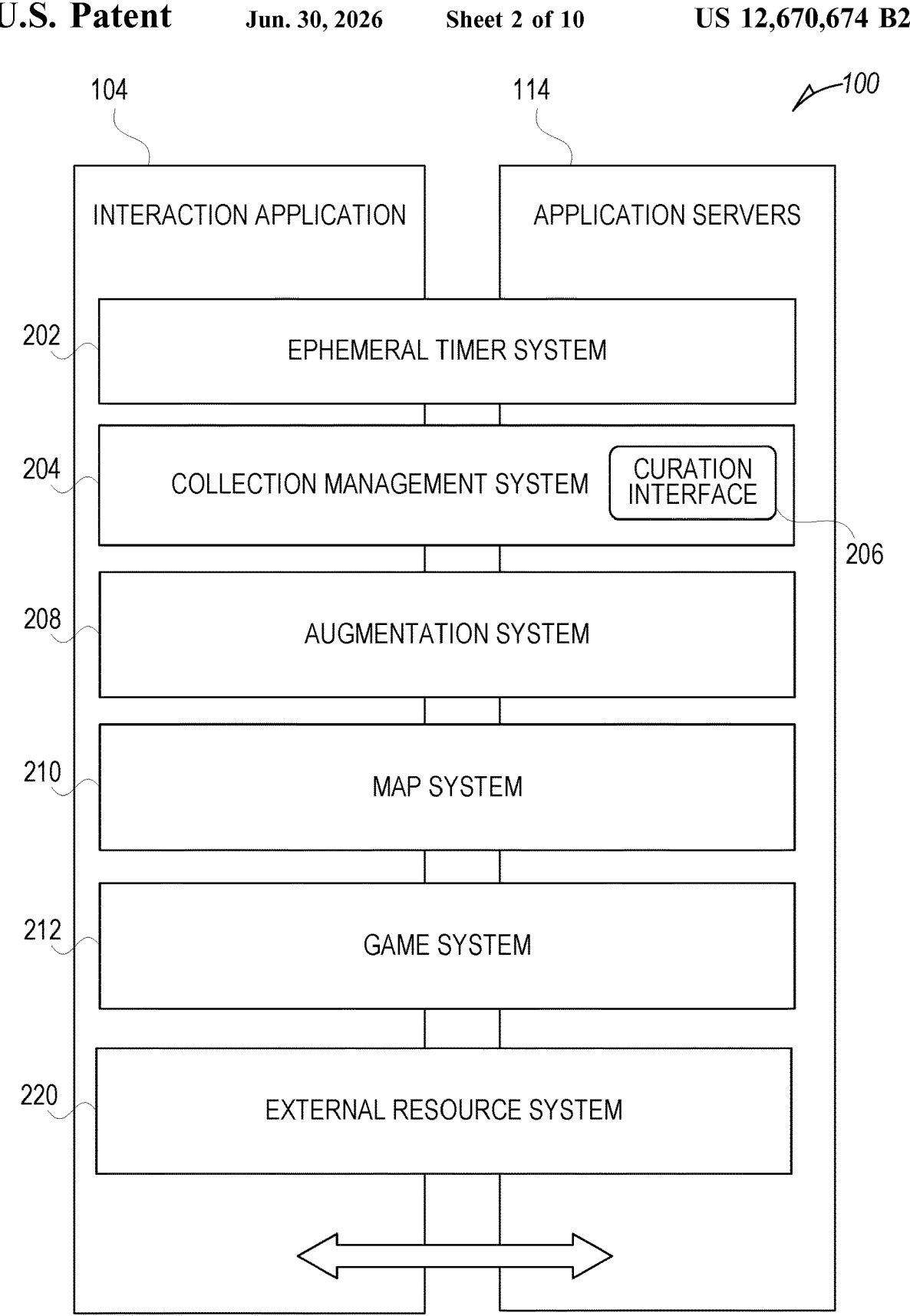
FIG. 2 is a diagrammatic representation of a messaging system, in accordance with some examples, that has both client-side and server-side functionality.

Image processing server 122 is used to implement scan functionality of the augmentation system 208 (FIG. 2). Scan functionality includes activating and providing one or more augmented reality experiences on a user device 102 when an image is captured by the user device 102. Specifically, the interaction application 104 on the user device 102 can be used to activate a camera. The camera displays one or more real-time images or a video to a user along with one or more icons or identifiers of one or more augmented reality experiences. The user can select a given one of the identifiers to launch the corresponding augmented reality experience. Launching the augmented reality experience includes obtaining one or more augmented reality items associated with the augmented reality experience and overlaying the augmented reality items on top of the images or video being presented.

Figure 3:
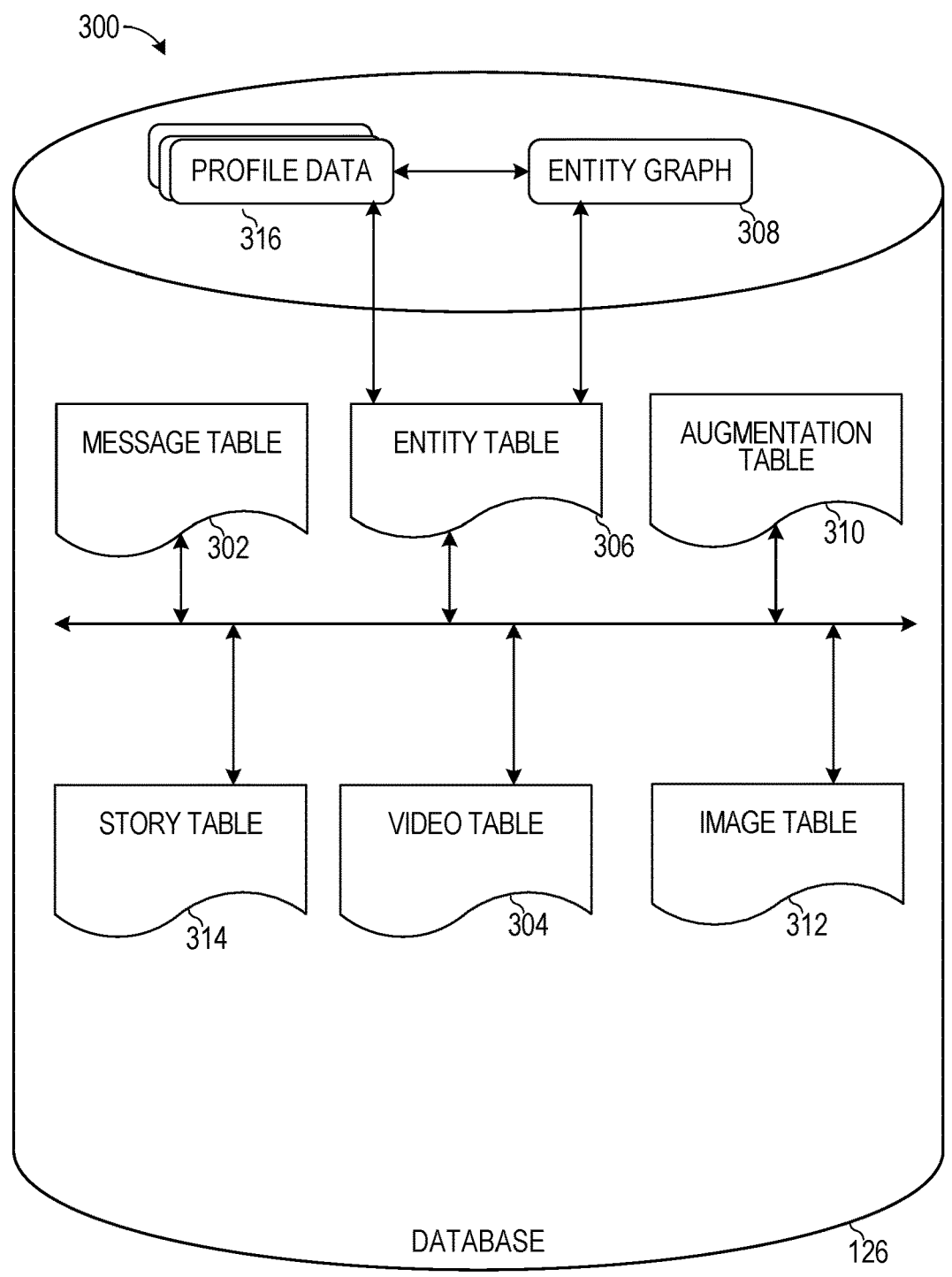
FIG. 3 is a diagrammatic representation of a data structure as maintained in a database, in accordance with some examples.

The social network server 124 supports various social networking functions and services and makes these functions and services available to the interaction application server 118. To this end, the social network server 124 maintains and accesses an entity graph 308 (as shown in FIG. 3) within the database 126. Examples of functions and services supported by the social network server 124 include the identification of other users of the system 100 with which a particular user has relationships or is "following," and also the identification of other entities and interests of a particular user.

Returning to the interaction application 104, features and functions of an external resource (e.g., a third-party application 109 or applet) are made available to a user via an interface of the interaction application 104. The interaction application 104 receives a user selection of an option to launch or access features of an external resource (e.g., a third-party resource), such as external apps 109. The external resource may be a third-party application (external apps 109) installed on the user device 102 (e.g., a "native app"), or a small-scale version of the third-party application (e.g., an "applet") that is hosted on the user device 102 or remote of the user device 102 (e.g., on third-party servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the interaction application 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource (external app 109), the interaction application 104 determines whether the selected external resource is a web-based external resource or a locally-installed external application. In some cases, external applications 109 that are locally installed on the user device 102 can be launched independently of and separately from the interaction application 104, such as by selecting an icon, corresponding to the external application 109, on a home screen of the user device 102. Small-scale versions of such external applications can be launched or accessed via the interaction application 104 and, in some examples, no or limited portions of the small-scale external application can be accessed outside of the interaction application 104. The small-scale external application can be launched by the interaction application 104 receiving, from an external app(s) server 110, a markup-language document associated with the small-scale external application and processing such a document.

In response to determining that the external resource is a locally-installed external application 109, the interaction application 104 instructs the user device 102 to launch the external application 109 by executing locally-stored code corresponding to the external application 109. In response to determining that the external resource is a web-based resource, the interaction application 104 communicates with the external app(s) servers 110 to obtain a markup-language document corresponding to the selected resource. The interaction application 104 then processes the obtained markup-language document to present the web-based external resource within a user interface of the interaction application 104.

The interaction application 104 can notify a user of the user device 102, or other users related to such a user (e.g., "friends"), of activity taking place in one or more external resources. For example, the interaction application 104 can provide participants in a conversation (e.g., a chat session) in the interaction application 104 with notifications relating to the current or recent use of an external resource by one or more members of a group of users. One or more users can be invited to join an active external resource or to launch a recently-used but currently inactive (in the group of friends) external resource. The external resource can provide participants in a conversation, each using a respective interaction application 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction application 104. The external resource can selectively include different media items in the responses, based on a current context of the external resource.

The interaction application 104 can present a list of the available external resources (e.g., third-party or external applications 109 or applets) to a user to launch or access a given external resource. This list can be presented in a context-sensitive menu. For example, the icons representing different ones of the external application 109 (or applets) can vary based on how the menu is launched by the user (e.g., from a conversation interface or from a non-conversation interface).

System Architecture

FIG. 2 is a block diagram illustrating further details regarding the system 100, according to some examples. Specifically, the system 100 is shown to include the interaction application 104 and the application servers 114. The system 100 embodies a number of subsystems, which are supported on the client side by the interaction application 104 and on the server side by the application servers 114. These subsystems include, for example, an ephemeral timer system 202, a collection management system 204, an augmentation system 208, a map system 210, a game system 212, and an external resource system 220.

The ephemeral timer system 202 is responsible for enforcing the temporary or time-limited access to content by the interaction application 104 and the interaction application server 118. The ephemeral timer system 202 incorporates a number of timers that, based on duration and display parameters associated with a message, or collection of messages (e.g., a story), selectively enable access (e.g., for presentation and display) to messages and associated content via the interaction application 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the interaction application 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the system 100. The augmentation system 208 operatively supplies a media overlay or augmentation (e.g., an image filter) to the interaction application 104 based on a geolocation of the user device 102. In another example, the augmentation system 208 operatively supplies a media overlay to the interaction application 104 based on other information, such as social network information of the user of the user device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the user device 102. For example, the media overlay may include text, a graphical element, or image that can be overlaid on top of a photograph taken by the user device 102. In another example, the media overlay includes an identification of a location overlay (e.g., Venice beach), a name of a live event, or a name of a merchant overlay (e.g., Beach Coffee House). In another example, the augmentation system 208 uses the geolocation of the user device 102 to identify a media overlay that includes the name of a merchant at the geolocation of the user device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to obtain augmented reality experiences and presents identifiers of such experiences in one or more user interfaces (e.g., as icons over a real-time image or video or as thumbnails or icons in interfaces dedicated for presented identifiers of augmented reality experiences). Once an augmented reality experience is selected, one or more images, videos, or augmented reality graphical elements are retrieved and presented as an overlay on top of the images or video captured by the user device 102. In some cases, the camera is switched to a front-facing view (e.g., the front-facing camera of the user device 102 is activated in response to activation of a particular augmented reality experience) and the images from the front-facing camera of the user device 102 start being displayed on the user device 102 instead of the rear-facing camera of the user device 102. The one or more images, videos, or augmented reality graphical elements are retrieved and presented as an overlay on top of the images that are captured and displayed by the front-facing camera of the user device 102.

The map system 210 provides various geographic location functions, and supports the presentation of map-based media content and messages by the interaction application 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the system 100 from a specific geographic location may be displayed within the context of a map at that particular location to "friends" of a specific user on a map interface of the interaction application 104. A user can furthermore share his or her location and status information (e.g., using an appropriate status avatar) with other users of the system 100 via the interaction application 104, with this location and status information being similarly displayed within the context of a map interface of the interaction application 104 to selected users.

The game system 212 provides various gaming functions within the context of the interaction application 104. The interaction application 104 provides a game interface providing a list of available games (e.g., web-based games or web-based applications) that can be launched by a user within the context of the interaction application 104, and played with other users of the system 100. The system 100 further enables a particular user to invite other users to participate in the play of a specific game, by issuing invitations to such other users from the interaction application 104. The interaction application 104 also supports both voice and text messaging (e.g., chats) within the context of gameplay, provides a leaderboard for the games, and also supports the provision of in-game rewards (e.g., coins and items).

The external resource system 220 provides an interface for the interaction application 104 to communicate with external app(s) servers 110 to launch or access external resources. Each external resource (apps) server 110 hosts, for example, a markup language (e.g., HTML5) based application or small-scale version of an external application (e.g., game, utility, payment, or ride-sharing application that is external to the interaction application 104). The interaction application 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the interaction application server 118. The SDK includes Application Programming Interfaces (APIs) with functions that can be called or invoked by the web-based application. In certain examples, the interaction application server 118 includes a JavaScript library that provides a given third-party resource access to certain user data of the interaction application 104. HTML5 is used as an example technology for programming games, but applications and resources programmed based on other technologies can be used.

In order to integrate the functions of the SDK into the web-based resource, the SDK is downloaded by an external resource (apps) server 110 from the interaction application server 118 or is otherwise received by the external resource (apps) server 110. Once downloaded or received, the SDK is included as part of the application code of a web-based external resource. The code of the web-based resource can then call or invoke certain functions of the SDK to integrate features of the interaction application 104 into the web-based resource.

The SDK stored on the interaction application server 118 effectively provides the bridge between an external resource (e.g., third-party or external applications 109 or applets and the interaction application 104). This provides the user with a seamless experience of communicating with other users on the interaction application 104, while also preserving the look and feel of the interaction application 104. To bridge communications between an external resource and an interaction application 104, in certain examples, the SDK facilitates communication between external resource servers 110 and the interaction application 104. In certain examples, a Web ViewJavaScriptBridge running on a user device 102 establishes two one-way communication channels between an external resource and the interaction application 104. Messages are sent between the external resource and the interaction application 104 via these communication channels asynchronously. Each SDK function invocation is sent as a message and callback. Each SDK function is implemented by constructing a unique callback identifier and sending a message with that callback identifier.

By using the SDK, not all information from the interaction application 104 is shared with external resource servers 110. The SDK limits which information is shared based on the needs of the external resource. In certain examples, each external resource server 110 provides an HTML5 file corresponding to the web-based external resource to the interaction application server 118. The interaction application server 118 can add a visual representation (such as a box art or other graphic) of the web-based external resource in the interaction application 104. Once the user selects the visual representation or instructs the interaction application 104 through a GUI of the interaction application 104 to access features of the web-based external resource, the interaction application 104 obtains the HTML5 file and instantiates the resources necessary to access the features of the web-based external resource.

The interaction application 104 presents a graphical user interface (e.g., a landing page or title screen) for an external resource. During, before, or after presenting the landing page or title screen, the interaction application 104 determines whether the launched external resource has been previously authorized to access user data of the interaction application 104. In response to determining that the launched external resource has been previously authorized to access user data of the interaction application 104, the interaction application 104 presents another graphical user interface of the external resource that includes functions and features of the external resource. In response to determining that the launched external resource has not been previously authorized to access user data of the interaction application 104, after a threshold period of time (e.g., 3 seconds) of displaying the landing page or title screen of the external resource, the interaction application 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the interaction application 104 adds the external resource to a list of authorized external resources and allows the external resource to access user data from the interaction application 104. In some examples, the external resource is authorized by the interaction application 104 to access the user data in accordance with an OAuth 2 framework.

The interaction application 104 controls the type of user data that is shared with external resources based on the type of external resource being authorized. For example, external resources that include full-scale external applications (e.g., a third-party or external application 109) are provided with access to a first type of user data (e.g., only two-dimensional avatars of users with or without different avatar characteristics). As another example, external resources that include small-scale versions of external applications (e.g., web-based versions of third-party applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

Data Architecture

FIG. 3 is a schematic diagram illustrating data structures 300, which may be stored in the database 126 of the server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302.

An entity table 306 stores entity data, and is linked (e.g., referentially) to an entity graph 308 and profile data 316.

Entities for which records are maintained within the entity table 306 may include individuals, corporate entities, organizations, objects, places, events, and so forth. Regardless of entity type, any entity regarding which the server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interest-based or activity-based, merely for example.

The profile data 316 stores multiple types of profile data about a particular entity. The profile data 316 may be selectively used and presented to other users of the system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the system 100, and on map interfaces displayed by interaction applications 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the interaction application 104 when the sending user is composing a message. Other types of filters include geolocation filters (also known as geo-filters), which may be presented to a sending user based on geographic location. For example, geolocation filters specific to a neighborhood or special location may be presented within a user interface by the interaction application 104, based on geolocation information determined by a Global Positioning System (GPS) unit of the user device 102.

Another type of filter is a data filter, which may be selectively presented to a sending user by the interaction application 104, based on other inputs or information gathered by the user device 102 during the message creation process. Examples of data filters include current temperature at a specific location, a current speed at which a sending user is traveling, battery life for a user device 102, or the current time.

Other augmentation data that may be stored within the image table 312 includes augmented reality content items (e.g., corresponding to applying augmented reality experiences). An augmented reality content item or augmented reality item may be a real-time special effect and sound that may be added to an image or a video.

As described above, augmentation data includes augmented reality content items (also referred to as virtual content items, virtual content, and/or virtual items), overlays, image transformations, AR images, and similar terms that refer to modifications that may be applied to image data (e.g., videos or images). This includes real-time modifications, which modify an image as it is captured using device sensors (e.g., one or multiple cameras) of a user device 102 and then displayed on a screen of the user device 102 with the modifications. This also includes modifications to stored content, such as video clips in a gallery that may be modified. For example, in a user device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a user device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements, characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one elements, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the user device 102) and perform complex image manipulations locally on the user device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the user device 102.

In some examples, a computer animation model to transform image data can be used by a system where a user may capture an image or video stream of the user (e.g., a selfie) using a user device 102 having a neural network operating as part of the interaction application 104 operating on the user device 102. The transformation system operating within the interaction application 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the user device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated images, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the interaction application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction application 104, to contribute content to a particular live story. The live story may be identified to the user by the interaction application 104, based on his or her location. The end result is a "live story" told from a community perspective.

A further type of content collection is known as a "location story," which enables a user whose user device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Eyewear Device

Figure 4:
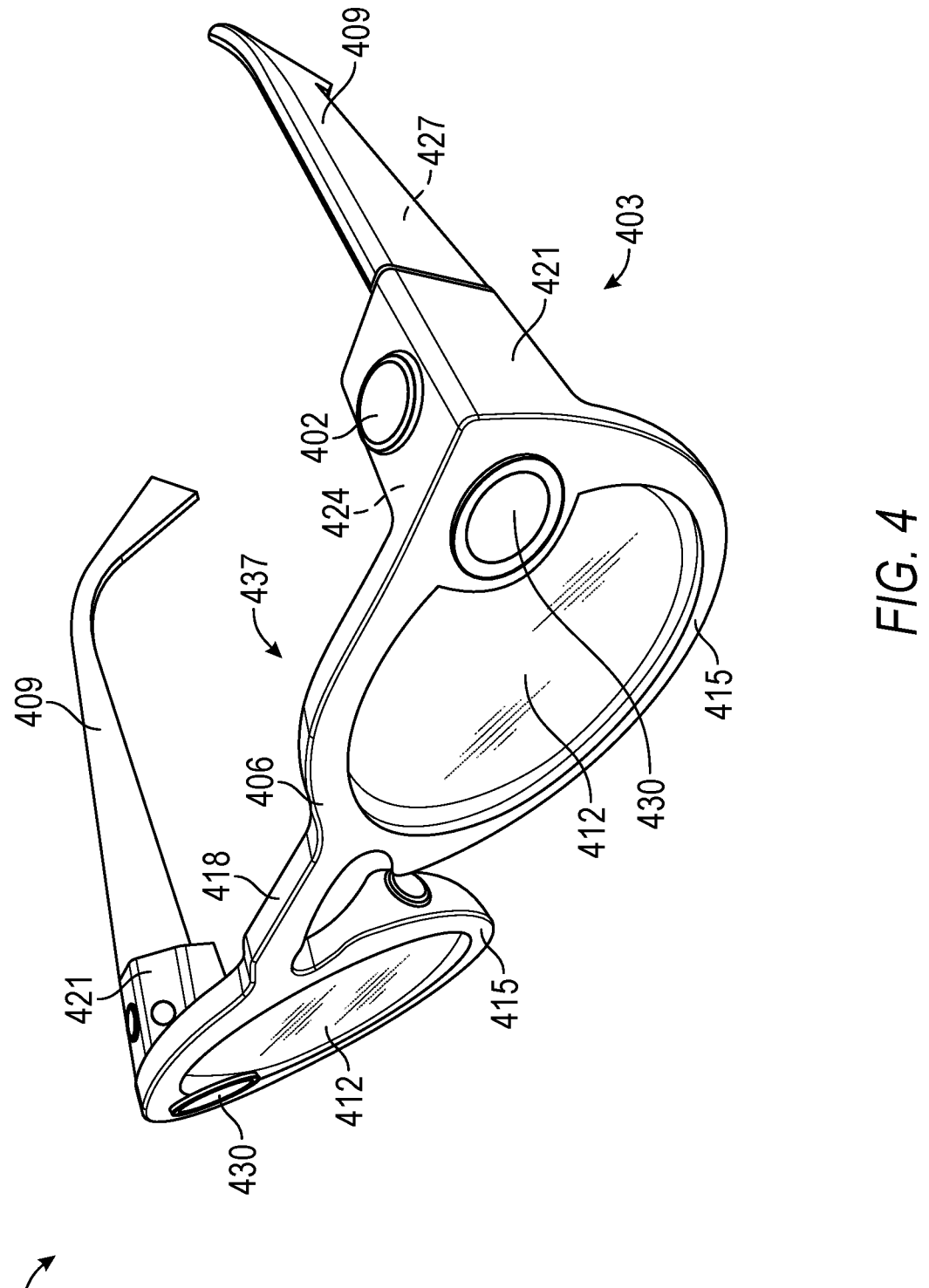
FIG. 4 is a perspective view of an eyewear device according to an example.

FIG. 4 shows a front perspective view of an eyewear device 119 in the form of a pair of smart glasses that include a content centering system 107 according to one example. The eyewear device 119 includes a body 403 including a front piece or frame 406 and a pair of temples 409 connected to the frame 406 for supporting the frame 406 in position on a user's face 437 when the eyewear device 119 is worn. The frame 406 can be made from any suitable material such as plastics or metal, including any suitable shape memory alloy. The eyewear device 119 can include a button 402 for capturing a content item (image or video).

The eyewear device 119 includes a pair of optical elements in the form of a pair of lenses 412 held by corresponding optical element holders in the form of a pair of rims 415 forming part of the frame 406. The rims 415 are connected by a bridge 418. In other examples, one or both of the optical elements can be a display, a display assembly, or a lens and display combination.

The frame 406 includes a pair of end pieces 421 defining lateral end portions of the frame 406. In this example, a variety of electronics components are housed in one or both of the end pieces 421. The temples 409 are coupled to the respective end pieces 421. In this example, the temples 409 are coupled to the frame 406 by respective hinges so as to be hingedly movable between a wearable mode and a collapsed mode in which the temples 409 are pivoted towards the frame 406 to lie substantially flat against it. In other examples, the temples 409 can be coupled to the frame 406 by any suitable means, or can be rigidly or fixedly secured to the frame 406 so as to be integral therewith.

Each of the temples 409 that includes a front portion of that is coupled to the frame 406 and any suitable rear portion for coupling to the ear of the user, such as the curves or cute piece illustrated in the example of FIG. 4. In some examples, the frame 406 is formed of a single piece of material, so as to have a unitary or monolithic construction. In some examples, the whole of the body 403 (including both the frame 406 and the temples 409) can be of the unitary or monolithic construction.

The eyewear device 119 has onboard electronics components including a computing device, such as a computer 424, or low power processor, which can in different examples be of any suitable type so as to be carried by the body 403. In some examples, the computer 424 is at least partially housed in one or both of the temples 409. In the present example, various components of the computer 424 are housed in the lateral end pieces 421 of the frame 406. The computer 424 includes one or more processors with memory (e.g., a volatile storage device, such as random access memory or registers), a storage device (e.g., a non-volatile storage device), wireless communication circuitry (e.g., BLE communication devices and/or WiFi direct devices), and a power source. The computer 424 comprises low-power circuitry, high-speed circuitry, and, in some examples, a display processor. Various examples may include these elements in different configurations or integrated together in different ways.

The computer 424 additionally includes a battery 427 or other suitable portable power supply. In one example, the battery 427 is disposed in one of the temples 409. In the eyewear device 119 shown in FIG. 4, the battery 427 is shown as being disposed in one of the end pieces 421, being electrically coupled to the remainder of the computer 424 housed in the corresponding end piece 421.

The eyewear device 119 is camera-enabled, in this example including a camera 430 mounted in one of the end pieces 421 and facing forwards so as to be aligned more or less with the direction of view of a wearer of the eyewear device 119. The camera 430 is configured to capture digital images (also referred to herein as digital photographs or pictures) as well as digital video content. Operation of the camera 430 is controlled by a camera controller provided by the computer 424, image data representative of images or video captured by the camera 430 being temporarily stored on a memory forming part of the computer 424. In some examples, the eyewear device 119 can have a pair of cameras 430, e.g. housed by the respective end pieces 421.

The eyewear device 119 (e.g., the AR glasses or VR devices) has computer vision capabilities and cameras that help orient virtual content in 6D of real world positions. The camera capabilities of the eyewear device 119 track the user's hands in real time to enable the user to control the virtual content using hand gestures. The camera 430 of the eyewear device 119 can include multiple video cameras that communicate with each other and with the on-board computer 424 to position the AR/VR content and track a user's hand position relative to the AR/VR content to control interactions with the AR/VR content.

As will be described in greater detail below, the onboard computer 424 and the lenses 412 are configured together to provide a content centering system 107 that automatically and selectively re-centers virtual content to bring the virtual content to within view of the lenses 412 by moving the virtual content from a first virtual location to a second virtual location. Specifically, the lenses 412 can display virtual content or one or more virtual objects. This makes it appear to the user that the virtual content is integrated within a real-world environment that the user views through the lenses 412. In some examples, the virtual content is received from the user device 102. In some examples, the virtual content is received directly from the application servers 114. The eyewear device 119 uses "computer vision processing" to position virtual content in the user's real world and tracks the position of the user's hands for real time input to the system.

The eyewear device 119 may include an accelerometer and a touch interface and a voice command system. Based on input received by the eyewear device 119 from the accelerometer and a touch interface and the voice command system, the eyewear device 119 can control user interaction with the virtual content. In some cases, the eyewear device 119, rather than using a touch interface to control virtual content interactions (or in addition to using the touch interface) uses front-facing cameras that can track the user's hands in real time via computer vision technologies. The eyewear device 119 can then control interactions with the virtual content based on positioning of the user's hands and gestures performed by the hands. In one example, the user interaction can control playback of content that is presented on the lenses 412. In another example, the user interaction can navigate through a playlist or music or video library. In another example, the user interaction can navigate through a conversation the user is involved in, such as by scrolling through various three-dimensional or two-dimensional conversation elements (e.g., chat bubbles) and selecting individual conversation elements to respond to generate messages to transmit to participants of the conversation.

The content centering system 107 (which can be implemented by the computer 424) assigns virtual content to virtual locations. The content centering system 107 monitors the current virtual location that is within view of a real-world environment. The content centering system 107 retrieves virtual content for display that is within a specified range of the current virtual location that is within view and at a specified virtual offset which may be set or adjusted by the user. As the eyewear device 119 is moved around to be directed to a new portion of the real-world environment, associated with a different set of virtual locations, the content centering system 107 updates the virtual location of the virtual content to maintain or keep the virtual content displayed at substantially the same virtual offset relative to a point (e.g., lenses) on the eyewear device 119. In some cases, the user is controlling and interacting with the virtual content using hand gestures. In these circumstances, it becomes important to position the virtual objects at a comfortable place in 3D space relative to the user. The disclosed techniques allow the user to control that specific position that is comfortable for the user to interact with the virtual content using the user's hands.

The eyewear device 119 further includes one or more communication devices, such as Bluetooth low energy (BLE) communication interface. Such BLE communication interface enables the eyewear device 119 to communicate wirelessly with the user device 102. Other forms of wireless communication can also be employed instead of, or in addition to, the BLE communication interface, such as a WiFi direct interface. The BLE communication interface implements a standard number of BLE communication protocols.

A first of the communications protocols implemented by the BLE interface of the eyewear device 119 enables an unencrypted link to be established between the eyewear device 119 and the user device 102. In this first protocol, the link-layer communication (the physical interface or medium) between the eyewear device 119 and the user device 102 includes unencrypted data. In this first protocol, the application layer (the communication layer operating on the physically exchanged data) encrypts and decrypts data that is physically exchanged in unencrypted form over the link layer of the BLE communication interface. In this way, data exchanged over the physical layer can freely be read by an eavesdropping device, but the eavesdropping device will not be able to decipher the data that is exchanged without performing a decryption operation in the application layer.

A second of the communications protocols implemented by the BLE interface of the eyewear device 119 enables an encrypted link to be established between the eyewear device 119 and the user device 102. In this second protocol, the link-layer communication (the physical interface) between the eyewear device 119 and the user device 102 receives data from the application layer and adds a first type of encryption to the data before exchanging the data over the physical medium. In this second protocol, the application layer (the communication layer operating on the physically exchanged data) may or may not use a second type of encryption to encrypt and decrypt data that is physically exchanged in encrypted form, using the first type of encryption, over the link layer of the BLE communication interface. Namely, data can be first encrypted by the application layer and then be further encrypted by the physical layer before being exchanged over the physical medium. Following the exchange over the physical medium, the data is then decrypted by the physical layer and then decrypted again (e.g., using a different type of encryption) by the application layer. In this way, data exchanged over the physical layer cannot be read by an eavesdropping device as the data is encrypted in the physical medium.

In some examples, the user device 102 communicates with the eyewear device 119 using the first protocol to exchange images or videos or virtual content between the interaction application 104 and the eyewear device 119.

Content Centering System

FIG. 5 is a flowchart illustrating example operations of the content centering system 107 in performing a process or method 500, according to examples. The process or method 500 may be embodied in computer-readable instructions for execution by one or more processors such that the operations of the process or method 500 may be performed in part or in whole by the functional components of the notification management system 107; accordingly, the process or method 500 is described below by way of example with reference thereto. However, in other examples, at least some of the operations of the process or method 500 may be deployed on various other hardware configurations. The process or method 500 is therefore not intended to be limited to the content centering system 107 and can be implemented in whole, or in part, by any other component. Some or all of the operations of process or method 500 can be in parallel, out of order, or entirely omitted.

At operation 501, the content centering system 107 displays, on a first portion of a real-world environment visible on a display of a user device, one or more virtual objects at a first virtual coordinate in three-dimensional (3D) space, as discussed above and below.

At operation 502, the content centering system 107 receives a request to move the one or more virtual objects to a second virtual coordinate in 3D space, as discussed above and below. For example, one or more cameras of the content centering system 107 can identify one or more hands of the user at a position in 3D space corresponding to the first virtual coordinate. In response, the content centering system 107 can determine that the one or more hands have performed a given gesture associated with dragging or moving a virtual object. In such cases, the content centering system 107 tracks movement of the hands in 3D space to identify the second virtual coordinate to which the hands have been moved. The content centering system 107 determines that the hands have performed another gesture associated with releasing the virtual object. In such cases, the content centering system 107 updates the virtual position of the virtual objects from being displayed at the first virtual coordinate to the second virtual coordinate.

At operation 503, the content centering system 107 in response to receiving the request, maintains display of the one or more virtual objects at the second virtual coordinate as a second portion of the real-world environment is visible on the display of the user device, as discussed above and below. Specifically, if a user additionally moves the virtual content using a hand interaction or other input method, independent of their body motion, the virtual content remains visible within the user's display FOV. The virtual content is prevented from being moved beyond/outside of the user's display FOV. If the user tries to move content outside of the FOV, the content centering system 107 may gently nudge (move or animate) the virtual content back into the visible FOV, still following the overall position of the AR device.

Figure 6:
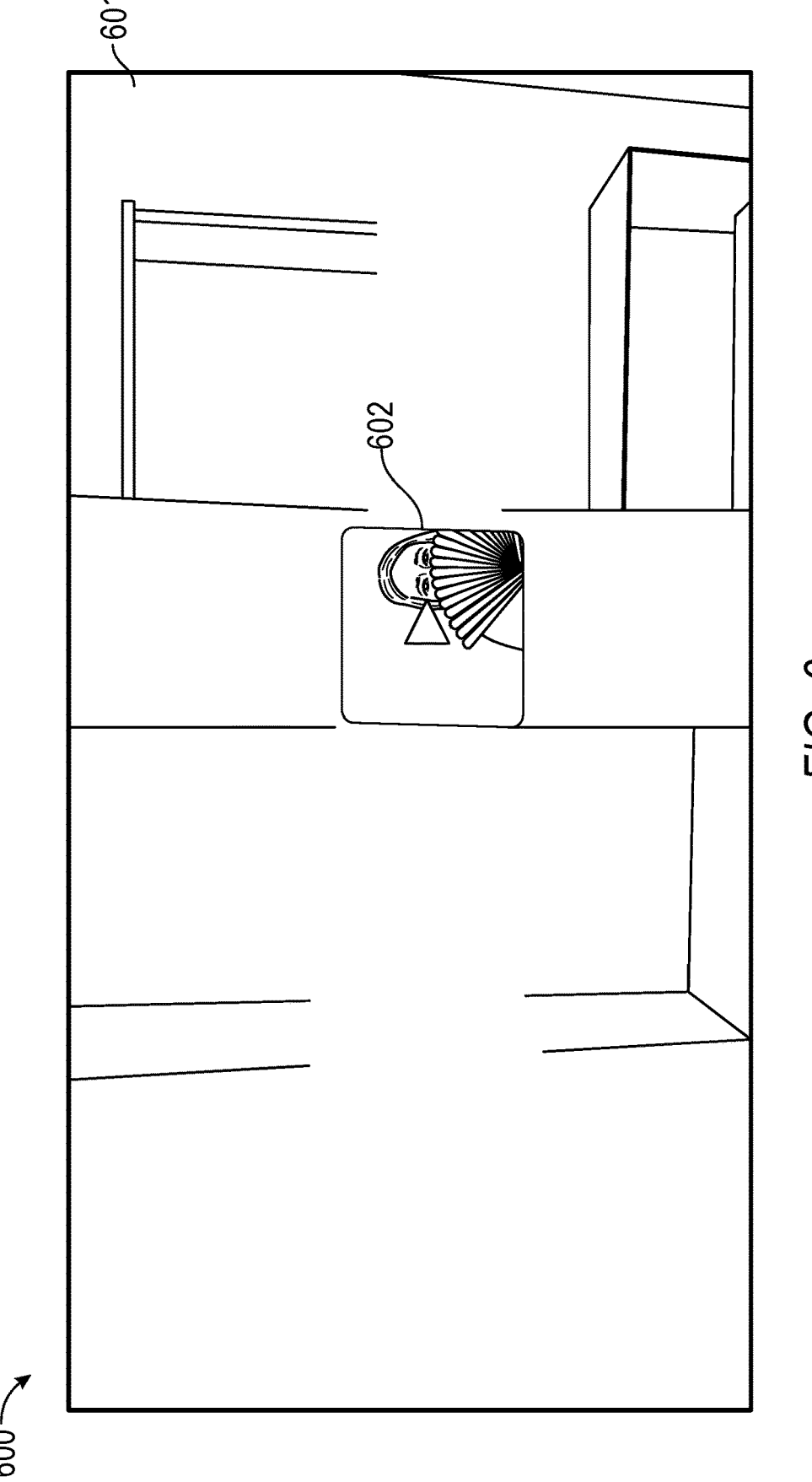
FIGS. 6-8 are illustrative screens of the content centering system according to examples.
Figure 7:
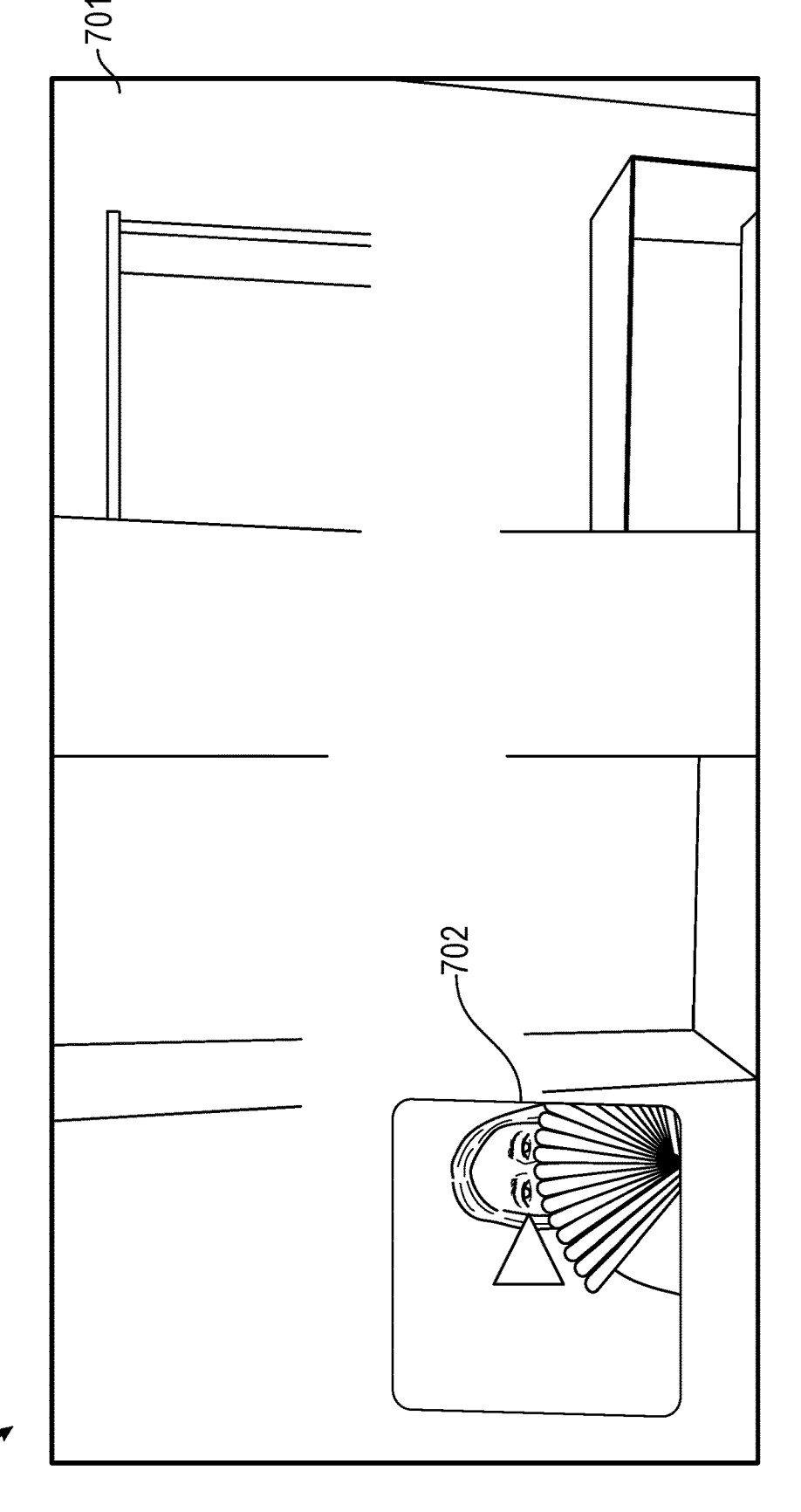
Figure 8:
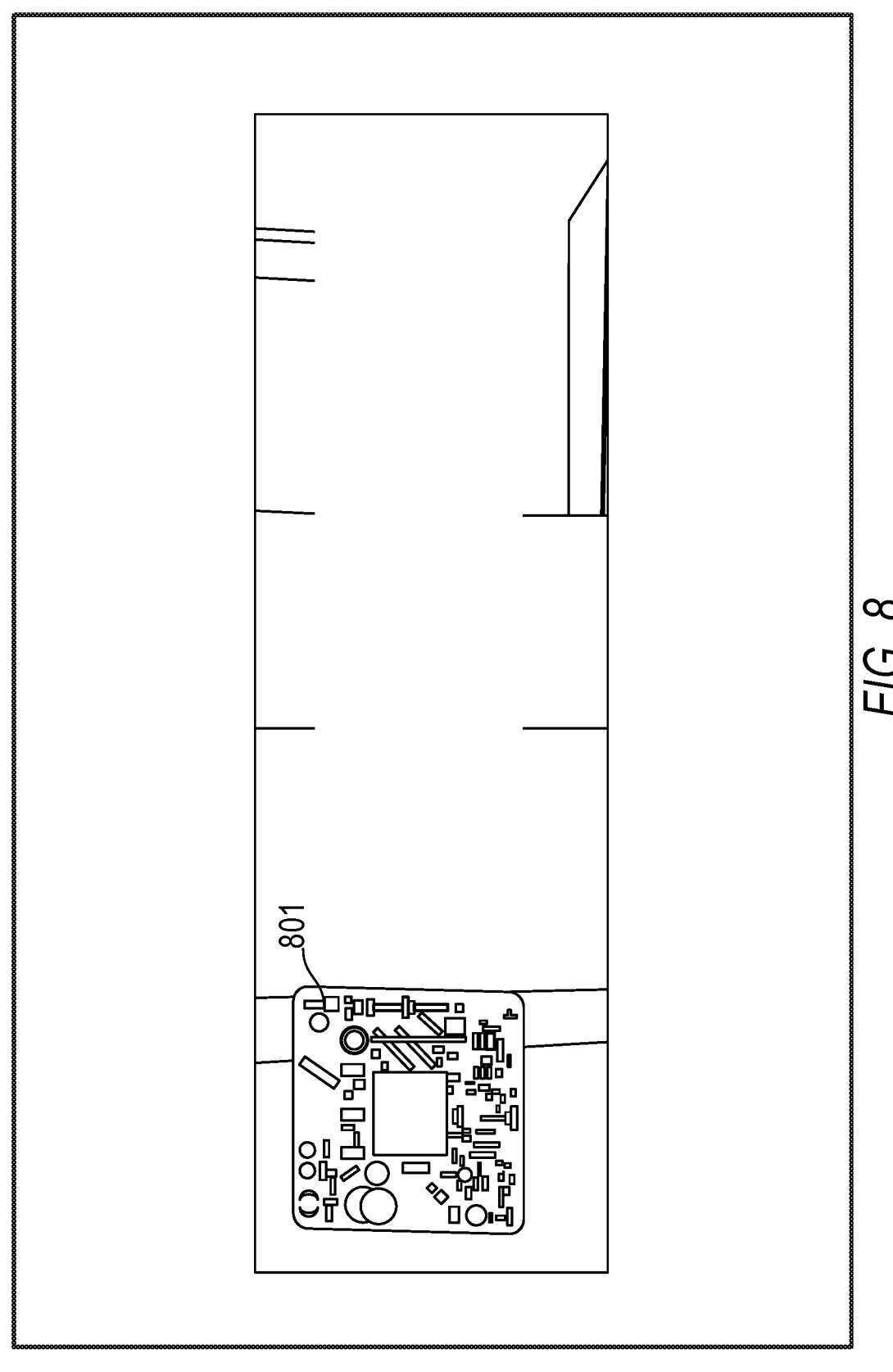

FIGS. 6-8 are illustrative screens of a graphical user interface of the content centering system 107, according to some examples. The screens shown in FIGS. 6-8 may be provided by the interaction application 104 of one or more client devices 102, other applications implemented on one or more client devices 102, and/or the eyewear device 119.

For example, the screen 600 shows a view of a first portion of a real-world environment 601 through the lenses 412 of the eyewear device 119. The eyewear device 119 may receive input from the user that requests to view a list of thumbnails representing a music or video library (or other virtual content item). In response, the eyewear device 119 obtains from the user device 102 and/or from the application servers 114 one or more virtual objects 602. The virtual objects 602 include thumbnails (e.g., cover art) representing different media assets (e.g., different songs or videos). The eyewear device 119 obtains default virtual display positions or virtual coordinates at which to display the virtual objects 602 from the user device 102 and/or the application servers 114.

The eyewear device 119 associates or places the virtual objects 602 at a first virtual location that is associated with the first portion of the real-world environment 601 based on the default virtual display position received by the eyewear device 119. In some cases, the eyewear device 119 displays the virtual objects 602 as 3D objects in a center of the lenses

412, at a default virtual height relative to a real-world surface visible through the lenses of the eyewear device 119 and at a default virtual distance relative to a point of the eyewear device 119. This makes it appear to the user viewing the first portion of the real-world environment 601 through the lenses 412 as if the virtual objects 602 are within the first portion of the real-world environment 601 at the first virtual location.

The eyewear device 119 can receive input from the user (e.g., via computer-vision recognized hand gestures/poses, verbally and/or via touch input or from the user device 102) to interact with the virtual objects 602. For example, the user can scroll through the virtual objects 602. The virtual objects 602 that are lower in the list can appear to be further away from the user than those that are earlier in the list. As the user scrolls through the virtual objects 602, the virtual objects that are later in the list, are enlarged and are brought into view closer to the user. The user can provide an input to select a given one of the virtual objects 602. In response, the media asset associated with the virtual object that is selected is retrieved and presented to the user. The user can pause and fast-forward and rewind playback of the media asset or perform any other function represented by a menu displayed as the virtual objects 602.

In some cases, the user moves around while wearing the eyewear device 119. For example, the user can turn their head to face another direction which results in a second portion of the real-world environment being viewed through the lenses 412 of the eyewear device 119. As the user turns their head, the virtual display position of the virtual objects 602 is updated to maintain display of the virtual objects 602 at the virtual offset relative to the user and/or point on the eyewear device 119. For example, if the virtual objects 602 were presented at a particular virtual height and virtual distance relative to the eyewear device 119 when the first portion of the real-world environment was being viewed, the virtual objects 602 can be presented at the same particular virtual height in the real world and virtual distance relative to the eyewear device 119 when the second portion of the real-world environment is being viewed.

In some cases, the eyewear device 119 receives input that updates the virtual offset associated with the virtual objects 602. For example, the input can request to modify the virtual height and/or the virtual distance relative to the point on the eyewear device 119 at which the virtual objects 602 are being displayed. This input can be received verbally or by the user selecting and dragging the virtual objects 602 to a desired virtual position in 3D space. In response, the eyewear device 119 updates the default virtual offset associated with the virtual objects 602. For example, as shown in FIG. 7, the screen 700 shows the virtual objects 702 (corresponding to the virtual objects 602) at a new virtual offset displayed on the real-world environment 701. Namely, the virtual objects 702 are presented closer to the point on the eyewear device 119 and lower in height than the virtual objects 602 presented in FIG. 6.

In some cases, the eyewear device 119 computes a new virtual offset by measuring the virtual distance between the point on the eyewear device 119 and the virtual objects 602 and by measuring the virtual height of the virtual objects 602 relative to a point on a surface of the real-world environment visible through the lenses of the eyewear device 119. The eyewear device 119 stores this new virtual offset in association with the virtual objects 602 so that when the virtual objects 602 is presented again at a future time (after being removed from being displayed), the virtual objects 602 is presented at the same virtual offset as that stored in association with the virtual objects 602.

In some cases, the eyewear device 119 can maintain presentation of the virtual objects 602 at the virtual offset as the eyewear device 119 is moved around to view other portions of the real-world environment. In some cases, the eyewear device 119 determines a type associated with the virtual objects 602. The eyewear device 119 updates a database that associates types of virtual objects with different virtual offsets based on the new virtual offset that is computed. For example, the eyewear device 119 can store or access a database that associates virtual thumbnails for music items with a first virtual offset and virtual menu items for AR experiences with a second virtual offset. When the user requests to access the menu for the virtual thumbnails for the music items, the eyewear device 119 presents the virtual thumbnails at the first virtual offset. In response to a request to access the menu items for the AR experiences, the eyewear device 119 presents the menu for the AR experiences at the second virtual offset. The eyewear device 119 can determine that the virtual objects 602 corresponds to virtual thumbnails for music items. In response, the eyewear device 119 updates the first virtual offset stored in the database to be the newly computed virtual offset and does not update the second virtual offset because the eyewear device 119 determines that the first virtual offset is associated with the same type of virtual object as the virtual objects 602.

In some cases, the eyewear device 119 receives input that drags the virtual objects 702 outside of the FOV of the user of the eyewear device 119 and/or one or more cameras of the eyewear device 119. The eyewear device 119 can receive input (via computer-vision recognized hand gestures/poses, verbally and/or using a cursor) that selects (e.g., taps) on the virtual objects 702 or places their hands over a position of the virtual objects 702. The input can then drag or move the virtual objects 702 outside of the FOV so that it is no longer visible in the real-world environment 701 that is perceived through the lenses of the eyewear device 119. At this point, the eyewear device 119 receives input that releases the virtual objects 702 while the virtual objects 702 are outside the FOV. In response to receiving the input that places and releases the virtual objects 702 outside of the FOV of the eyewear device 119, the eyewear device 119 automatically repositions the virtual objects 702 at a virtual coordinate that is within the FOV of the eyewear device 119 or the user. The virtual coordinate can correspond to the virtual offset or some other user specified point in 3D space.

In some examples, the eyewear device 119 receives a user request to access another set or type of virtual object, such as the virtual object 801 shown in the user interface 800 of FIG. 8. The eyewear device 119 retrieves the default virtual coordinate associated with the virtual object 801. The eyewear device 119 determines whether the type of the virtual object 801 matches one of the types of virtual objects for which the user previously defined a virtual offset. If so, the eyewear device 119 automatically repositions and adjusts the default virtual coordinate of the virtual object 801 so that the virtual object 801 is positioned in 3D space at the same or substantially the same virtual coordinate or virtual offset as the virtual objects 702 that was previously displayed by the eyewear device 119.

In response to the eyewear device 119 determining that the virtual object 801 is of a type that is not associated with a virtual offset previously defined by the user, the eyewear device 119 can present the virtual object 801 at the default virtual coordinate. The eyewear device 119 can present a prompt or message for the user of the eyewear device 119 informing the user that the default position can be adjusted for the virtual object 801. The eyewear device 119 can receive input that moves the virtual object 801 to a new virtual coordinate. The eyewear device 119 computes the virtual offset based on the new virtual coordinate relative to the user and associates that virtual offset with the type of virtual content corresponding to the virtual object 801. The eyewear device 119 can present a prompt requesting the user to confirm whether to associate the virtual offset of the virtual object 801 with all other virtual content that is of the same type as the virtual object 801. In response to receiving input from the user confirming this operation, the eyewear device 119 automatically updates the default virtual coordinate for that type of virtual content with the virtual offset of the virtual object 801.

EXAMPLES

Example 1. A method comprising: displaying, by at least one processor on a first portion of a real-world environment visible on a display of a user device, one or more virtual objects at a first virtual coordinate in three-dimensional (3D) space; receiving a request to move the one or more virtual objects to a second virtual coordinate in 3D space; and in response to receiving the request, maintaining display of the one or more virtual objects at the second virtual coordinate as a second portion of the real-world environment is visible on the display of the user device.

Example 2. The method of Example 1, wherein the first virtual coordinate comprises a default position for the one or more virtual objects.

Example 3. The method of Example 2, further comprising: determining a type associated with the one or more virtual objects; and obtaining the default position based on the type associated with the one or more virtual objects.

Example 4. The method of Example 3, further comprising: associating the second virtual coordinate with the type associated with the one or more virtual objects to replace the default position with the second virtual coordinate.

Example 5. The method of any one of Examples 1-4, further comprising: computing a virtual offset between the second virtual coordinate of the one or more virtual objects and a point on the user device, the virtual offset defining a 3D height relative to a surface of the real-world environment and a virtual distance between the point and the second virtual coordinate; and storing the virtual offset in a profile associated with a user.

Example 6. The method of Example 5, further comprising: receiving a request to access an additional virtual object; retrieving a default virtual position of the additional virtual object; computing a target virtual position by adjusting the default virtual position based on the virtual offset; and displaying the additional virtual object at the target virtual position.

Example 7. The method of Example 6, further comprising: displaying the additional virtual object at a same 3D height relative to the surface of the real-world environment and a same virtual distance between the point of the user device and the second virtual coordinate as the 3D height and the virtual distance of the one or more virtual objects.

Example 8. The method of any one of Examples 1-7, further comprising: receiving input that moves the one or more virtual objects to a third virtual coordinate in 3D space that is outside of a field of view (FOV) of the user device.

Example 9. The method of Example 8, further comprising: in response to receiving the input that moves the one or more virtual objects to a third virtual coordinate in 3D space that is outside of the FOV of the user device, automatically positioning the one or more virtual objects at a predetermined virtual coordinate in 3D space, the predetermined virtual coordinate corresponding to a position that is inside of the FOV of the user device.

Example 10. The method of Example 9, further comprising: receiving input that defines the predetermined virtual coordinate prior to receiving the input that moves the one or more virtual objects to the third virtual coordinate.

Example 11. The method of any one of Examples 9-10, wherein the one or more virtual objects are automatically positioned at the predetermined virtual coordinate in 3D space in response to receiving a command to terminate moving of the one or more virtual objects to the third virtual coordinate in 3D space that is outside of the field of view (FOV) of the user device.

Example 12. The method of any one of Examples 1-11, wherein the user device comprises an augmented reality (AR) eyewear device.

Example 13. The method of any one of Examples 1-12, wherein the one or more objects comprise one or more thumbnails representing respective media assets.

Example 14. The method of any one of Examples 1-13, wherein the one or more objects comprise conversation elements that represent a conversation in which a user of the user device is involved.

Example 15. The method of any one of Examples 1-14, wherein the one or more objects comprise user interface elements for controlling and playing back one or more content items.

Example 16. The method of any one of Examples 1-15, wherein the one or more objects comprise user interface elements for generating augmented reality content.

Example 17. The method of claim 1, wherein receiving the request comprises: detecting by one or more cameras of the user device a position of hands of the user at the first virtual coordinate; determining that the hands of the user perform a gesture associating with moving the one or more virtual objects; and determining that the hands have been moved to the second virtual coordinate.

Example 18. A system comprising: a storage device; and at least one processor configured to perform operations comprising: displaying, by at least one processor on a first portion of a real-world environment visible on a display of a user device, one or more virtual objects at a first virtual coordinate in three-dimensional (3D) space; receiving a request to move the one or more virtual objects to a second virtual coordinate in 3D space; and in response to receiving the request, maintaining display of the one or more virtual objects at the second virtual coordinate as a second portion of the real-world environment is visible on the display of the user device.

Example 19. The system of Example 18, the operations further comprising: determining a type associated with the one or more virtual objects; and obtaining the default position based on the type associated with the one or more virtual objects.

Example 20. A non-transitory machine-readable storage medium comprising instructions that, when executed by one or more processors of a machine, cause the machine to perform operations comprising: displaying, by at least one processor on a first portion of a real-world environment visible on a display of a user device, one or more virtual objects at a first virtual coordinate in three-dimensional (3D) space; receiving a request to move the one or more virtual objects to a second virtual coordinate in 3D space; and in response to receiving the request, maintaining display of the one or more virtual objects at the second virtual coordinate as a second portion of the real-world environment is visible on the display of the user device.

Machine Architecture

Figure 9:
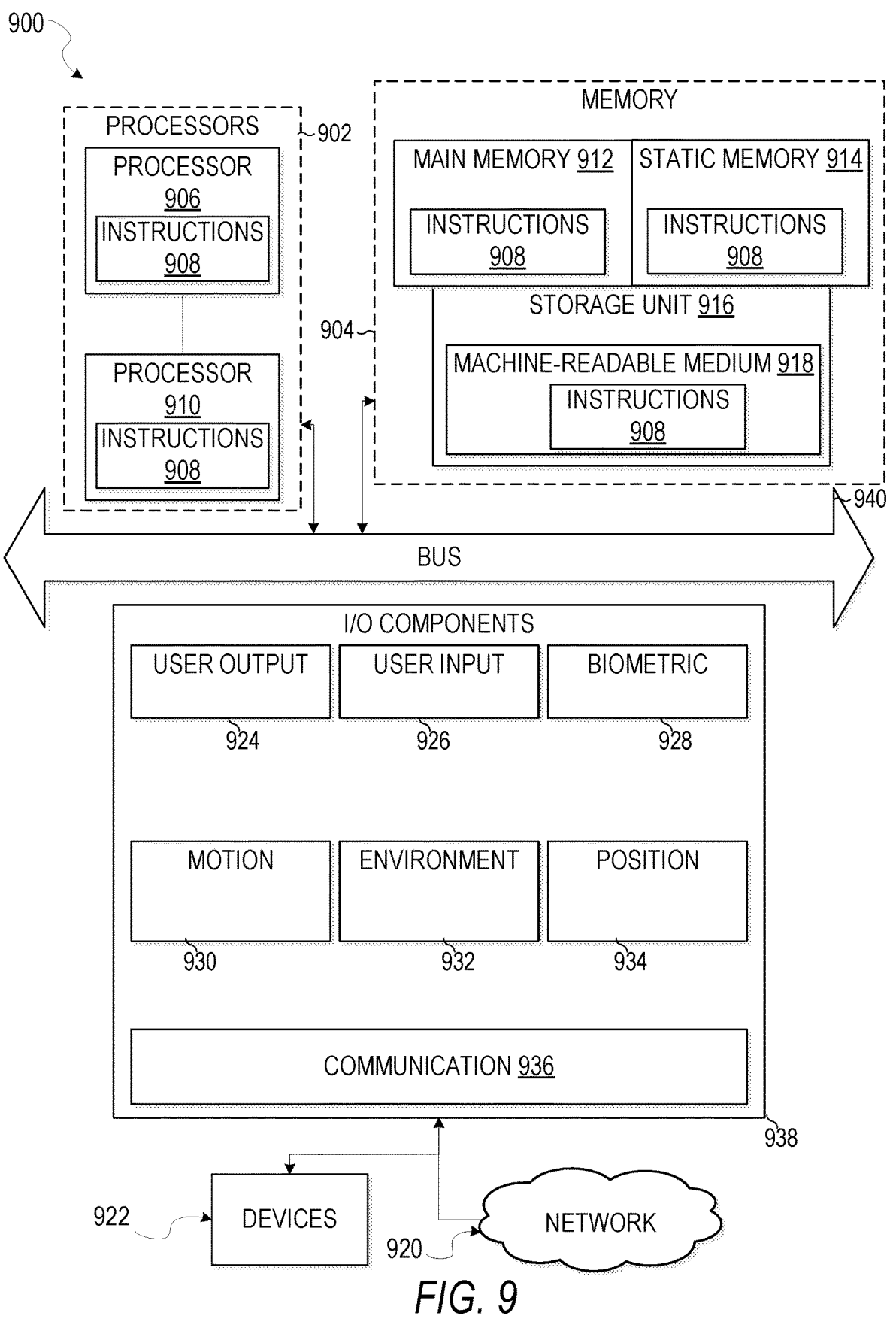
FIG. 9 is a diagrammatic representation of a machine in the form of a computer system within which a set of instructions may be executed for causing the machine to perform any one or more of the methodologies discussed herein, in accordance with some examples.

FIG. 9 is a diagrammatic representation of the machine 900 within which instructions 908 (e.g., software, a program, an application, an applet, an app, or other executable code) for causing the machine 900 to perform any one or more of the methodologies discussed herein may be executed. For example, the instructions 908 may cause the machine 900 to execute any one or more of the methods described herein. The instructions 908 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein. The machine 900, for example, may comprise the user device 102 or any one of a number of server devices forming part of the server system 108. In some examples, the machine 900 may also comprise both client and server systems, with certain operations of a particular method or algorithm being performed on the server-side and with certain operations of the particular method or algorithm being performed on the client-side.

The machine 900 may include processors 902, memory 904, and input/output (I/O) components 938, which may be configured to communicate with each other via a bus 940. In an example, the processors 902 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 906 and a processor 910 that execute the instructions 908. The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single-core, a single processor with multiple cores (e.g., a multi-core processor), multiple processors with a single core, multiple processors with multiples cores, or any combination thereof.

The memory 904 includes a main memory 912, a static memory 914, and a storage unit 916, all accessible to the processors 902 via the bus 940. The main memory 904, the static memory 914, and the storage unit 916 store the instructions 908 embodying any one or more of the methodologies or functions described herein. The instructions 908 may also reside, completely or partially, within the main memory 912, within the static memory 914, within machine-readable medium 918 within the storage unit 916, within at least one of the processors 902 (e.g., within the processor's cache memory), or any suitable combination thereof, during execution thereof by the machine 900.

The I/O components 938 may include a wide variety of components to receive input, provide output, produce output, transmit information, exchange information, capture measurements, and so on. The specific I/O components 938 that are included in a particular machine will depend on the type of machine. For example, portable machines such as mobile phones may include a touch input device or other such input mechanisms, while a headless server machine will likely not include such a touch input device. It will be appreciated that the I/O components 938 may include many other components that are not shown in FIG. 9. In various examples, the I/O components 938 may include user output components 924 and user input components 926. The user output components 924 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 926 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 938 may include biometric components 928, motion components 930, environmental components 932, or position components 934, among a wide array of other components. For example, the biometric components 928 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 930 include acceleration sensor components (e.g., accelerometer), gravitation sensor components, and rotation sensor components (e.g., gyroscope).

The environmental components 932 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user device 102 may have a camera system comprising, for example, front cameras on a front surface of the user device 102 and rear cameras on a rear surface of the user device 102. The front cameras may, for example, be used to capture still images and video of a user of the user device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user device 102 may also include a 360° camera for capturing 360° photographs and videos.

Further, the camera system of a user device 102 may include dual rear cameras (e.g., a primary camera as well as a depth-sensing camera), or even triple, quad or penta rear camera configurations on the front and rear sides of the user device 102. These multiple cameras systems may include a wide camera, an ultra-wide camera, a telephoto camera, a macro camera, and a depth sensor, for example.

The position components 934 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 938 further include communication components 936 operable to couple the machine 900 to a network 920 or devices 922 via respective coupling or connections. For example, the communication components 936 may include a network interface component or another suitable device to interface with the network 920. In further examples, the communication components 936 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 922 may be another machine or any of a wide variety of peripheral devices (e.g., a peripheral device coupled via a USB).

Moreover, the communication components 936 may detect identifiers or include components operable to detect identifiers. For example, the communication components 936 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 936, such as location via Internet Protocol (IP) geolocation, location via Wi-Fi® signal triangulation, location via detecting an NFC beacon signal that may indicate a particular location, and so forth.

The various memories (e.g., main memory 912, static memory 914, and memory of the processors 902) and storage unit 916 may store one or more sets of instructions and data structures (e.g., software) embodying or used by any one or more of the methodologies or functions described herein. These instructions (e.g., the instructions 908), when executed by processors 902, cause various operations to implement the disclosed examples.

The instructions 908 may be transmitted or received over the network 920, using a transmission medium, via a network interface device (e.g., a network interface component included in the communication components 936) and using any one of several well-known transfer protocols (e.g., hypertext transfer protocol (HTTP). Similarly, the instructions 908 may be transmitted or received using a transmission medium via a coupling (e.g., a peer-to-peer coupling) to the devices 922.

Software Architecture

Figure 10:
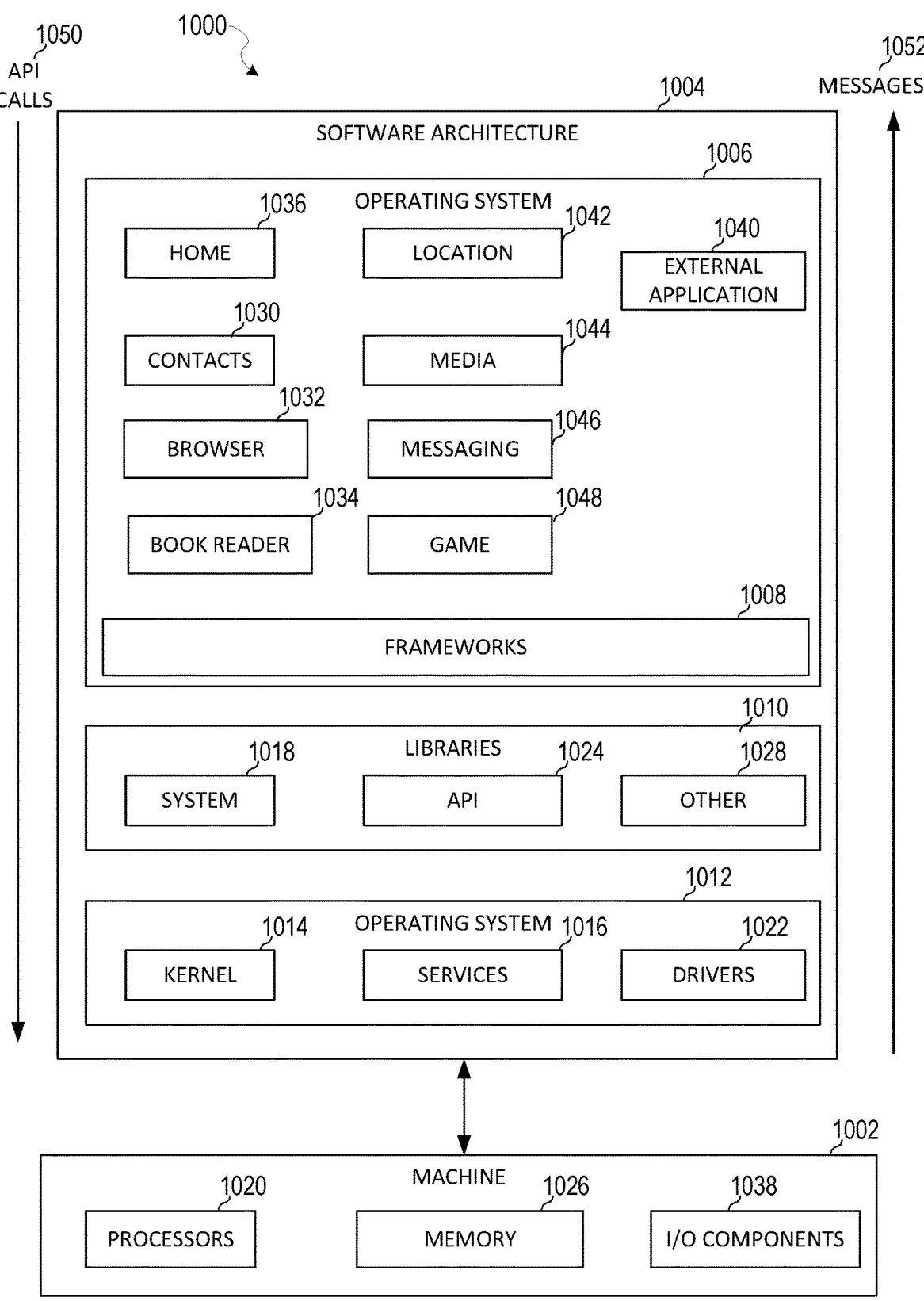
FIG. 10 is a block diagram showing a software architecture within which examples may be implemented.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1010 provide a common low-level infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a common high-level infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications such as an external application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the external application 1040 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the external application 1040 can invoke the API calls 1050 provided by the operating system 1012 to facilitate functionality described herein.

Glossary:

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example, the processors or processor-implemented components may be located in a single geographic location (e.g., within a home environment, an office environment, or a server farm). In other examples, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed examples without departing from the scope of the present disclosure. These and other changes or modifications are intended to be included within the scope of the present disclosure, as expressed in the following claims.

Modules, Components, and Logic

Certain examples are described herein as including logic or a number of components, modules, or mechanisms. Modules can constitute either software modules (e.g., code embodied on a machine-readable medium or in a transmission signal) or hardware modules. A "hardware module" is a tangible unit capable of performing certain operations and can be configured or arranged in a certain physical manner. In various examples, one or more computer systems (e.g., a standalone computer system, a client computer system, or a server computer system) or one or more hardware modules of a computer system (e.g., a processor or group of processors) is configured by software (e.g., an application or application portion) as a hardware module that operates to perform certain operations as described herein.

In some examples, a hardware module is implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application-Specific Integrated Circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering examples in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In examples in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some examples, the processors or processor-implemented modules are located in a single geographic location (e.g., within a home environment, an office environment, or a server farm). In other examples, the processors or processor-implemented modules are distributed across a number of geographic locations.

What is claimed is:

1. A method comprising:

displaying, by at least one processor on a first portion of a real-world environment visible on a display of a user device, one or more virtual objects at a first virtual coordinate in three-dimensional (3D) space;

receiving a request to move the one or more virtual objects to a second virtual coordinate in the 3D space;

in response to receiving the request, maintaining display of the one or more virtual objects at the second virtual coordinate as a second portion of the real-world environment is visible on the display of the user device;

computing a virtual offset between the second virtual coordinate of the one or more virtual objects and a point on the user device, the virtual offset being defined by a first vertical height relative to a surface of the real-world environment and a first virtual distance between the point and the second virtual coordinate; and storing the virtual offset in a profile associated with a user.

2. The method of claim 1, wherein the first virtual coordinate comprises a default position for the one or more virtual objects.

3. The method of claim 2, further comprising:

determining a type associated with the one or more virtual objects; and obtaining the default position based on the type associated with the one or more virtual objects.

4. The method of claim 3, further comprising:

associating the second virtual coordinate with the type associated with the one or more virtual objects to replace the default position with the second virtual coordinate.

5. The method of claim 1, further comprising:

receiving an additional request to access an additional virtual object;

retrieving a default virtual position of the additional virtual object;

computing a target virtual position by adjusting the default virtual position based on the virtual offset; and displaying the additional virtual object at the target virtual position.

6. The method of claim 5, further comprising:

displaying the additional virtual object at a same vertical height relative to the surface of the real-world environment and a same virtual distance between the point of the user device and the second virtual coordinate as the first vertical height and the first virtual distance of the one or more virtual objects.

7. The method of claim 1, further comprising:

receiving input that selects and moves the one or more virtual objects to a third virtual coordinate in the 3D space that is outside of a field of view (FOV) of the user device.

8. The method of claim 7, further comprising:

in response to receiving the input that selects and moves the one or more virtual objects to the third virtual coordinate in the 3D space that is outside of the FOV of the user device, automatically positioning the one or more virtual objects at a predetermined virtual coordinate in the 3D space, the predetermined virtual coordinate corresponding to a position that is inside of the FOV of the user device.

9. The method of claim 8, further comprising:

receiving input that defines the predetermined virtual coordinate prior to receiving the input that moves the one or more virtual objects to the third virtual coordinate.

10. The method of claim 8, wherein the one or more virtual objects are automatically positioned at the predetermined virtual coordinate in the 3D space in response to receiving a command to terminate moving of the one or more virtual objects to the third virtual coordinate in the 3D space that is outside of the field of view (FOV) of the user device.

11. The method of claim 1, wherein the user device comprises an augmented reality (AR) eyewear device.

12. The method of claim 1, wherein the one or more virtual objects comprise one or more thumbnails representing respective media assets.

13. The method of claim 1, wherein the one or more virtual objects comprise conversation elements that represent a conversation in which the user of the user device is involved.

14. The method of claim 1, wherein the one or more virtual objects comprise user interface elements for controlling and playing back one or more content items.

15. The method of claim 1, wherein the one or more virtual objects comprise user interface elements for generating augmented reality content.

16. The method of claim 1, wherein receiving the request comprises:

detecting by one or more cameras of the user device a position of hands of the user at the first virtual coordinate;

determining that the hands of the user perform a gesture associated with moving the one or more virtual objects; and determining that the hands have been moved to the second virtual coordinate.

17. A system comprising:

a storage device; and at least one processor configured to perform operations comprising:

displaying, by the at least one processor on a first portion of a real-world environment visible on a display of a user device, one or more virtual objects at a first virtual coordinate in three-dimensional (3D) space;

receiving a request to move the one or more virtual objects to a second virtual coordinate in the 3D space;

in response to receiving the request, maintaining display of the one or more virtual objects at the second virtual coordinate as a second portion of the real-world environment is visible on the display of the user device;

computing a virtual offset between the second virtual coordinate of the one or more virtual objects and a point on the user device, the virtual offset being defined by a first vertical height relative to a surface of the real-world environment and a first virtual distance between the point and the second virtual coordinate; and storing the virtual offset in a profile associated with a user.

18. The system of claim 17, wherein the first virtual coordinate comprises a default position for the one or more virtual objects.

19. A non-transitory machine-readable storage medium comprising instructions that, when executed by one or more processors of a machine, cause the machine to perform operations comprising:

displaying, on a first portion of a real-world environment visible on a display of a user device, one or more virtual objects at a first virtual coordinate in three-dimensional (3D) space;

receiving a request to move the one or more virtual objects to a second virtual coordinate in the 3D space;

in response to receiving the request, maintaining display of the one or more virtual objects at the second virtual coordinate as a second portion of the real-world environment is visible on the display of the user device;

computing a virtual offset between the second virtual coordinate of the one or more virtual objects and a point on the user device, the virtual offset being defined by a first vertical height relative to a surface of the real-world environment and a first virtual distance between the point and the second virtual coordinate; and storing the virtual offset in a profile associated with a user.

20. The non-transitory machine-readable storage medium of claim 19, wherein the first virtual coordinate comprises a default position for the one or more virtual objects.

* * * * *